US012591843B2

(12) United States Patent
Gupta et al.

(10) Patent No.: US 12,591,843 B2
(45) Date of Patent: Mar. 31, 2026

(54) SCALABLE AND EFFICIENT PACKAGE DELIVERY USING TRANSPORTER FLEET

(71) Applicant: DoorDash, Inc., San Francisco, CA (US)

(72) Inventors: Gagan Gupta, San Francisco, CA (US); Viraj Bindra, San Francisco, CA (US); Larry Waldman, San Francisco, CA (US); Rajat Shroff, Redwood Shores, CA (US)

(73) Assignee: DoorDash, Inc., San Francisco, CA (US)

( * ) Notice: Subject to any disclaimer, the term of this patent is extended or adjusted under 35 U.S.C. 154(b) by 199 days.

(21) Appl. No.: 18/345,528

(22) Filed: Jun. 30, 2023

(65) Prior Publication Data

US 2024/0005334 A1     Jan. 4, 2024

Related U.S. Application Data

(60) Provisional application No. 63/357,444, filed on Jun. 30, 2022, provisional application No. 63/357,452, filed on Jun. 30, 2022.

(51) Int. Cl.
*G06Q 30/00*          (2023.01)
*G06Q 10/0832*     (2023.01)
(Continued)

(52) U.S. Cl.
CPC ..... *G06Q 10/0837* (2013.01); *G06Q 10/0832* (2013.01); *G06Q 10/0833* (2013.01);
(Continued)

(58) Field of Classification Search
None
See application file for complete search history.

(56) References Cited

U.S. PATENT DOCUMENTS

| | | | |
|---|---|---|---|
| 6,384,850 | B1 | 5/2002 | McNally et al. |
| 6,871,325 | B1 | 3/2005 | McNally et al. |

(Continued)

FOREIGN PATENT DOCUMENTS

| | | | |
|---|---|---|---|
| WO | 0068856 | A2 | 11/2000 |
| WO | 0122289 | A1 | 3/2001 |
| WO | 2021087351 | A1 | 5/2021 |

OTHER PUBLICATIONS

OCD: Online Crowdsourced Delivery for On-Demand Food. Teaches a logistics system for arranging the crowdsourced delivery of food orders to the correct customers as soon as possible and at the lowest cost (pp. 6843-6852 generally). IEEE Internet of Things Journal, vol. 7, No. 8, Aug. 2020 (Year: 2020).*

(Continued)

*Primary Examiner* — Matthew T Sittner
(74) *Attorney, Agent, or Firm* — Kilpatrick Townsend & Stockton LLP

(57)          ABSTRACT
A method includes providing, by server computer to a service provider, an onboarding interface for onboarding a service provider to accept returns initiated by end users and from a plurality of available transporters, and then receiving, by the server computer, selections from the service provider regarding different options for processing returns via the onboarding interface. The server computer can receive a plurality of return orders for a plurality of items from a plurality of end users. and process the return orders according to the stored and selected options.

20 Claims, 18 Drawing Sheets

(51) Int. Cl.

| | |
|---|---|
| *G06Q 10/0833* | (2023.01) |
| *G06Q 10/0837* | (2023.01) |
| *G06Q 30/014* | (2023.01) |
| *G06Q 50/40* | (2024.01) |
| *G06Q 10/083* | (2024.01) |

(52) U.S. Cl.

CPC .......... *G06Q 30/014* (2013.01); *G06Q 50/40* (2024.01); *G06Q 10/0838* (2013.01)

(56) References Cited

U.S. PATENT DOCUMENTS

| | | | |
|---|---|---|---|
| 6,982,733 B1 | 1/2006 | McNally et al. | |
| 7,653,457 B2 | 1/2010 | Bloom | |
| 8,146,077 B2 | 3/2012 | McNally et al. | |
| 8,219,463 B2 | 7/2012 | Dearlove et al. | |
| 8,417,574 B2 | 4/2013 | Chalmers et al. | |
| 9,009,060 B2 | 4/2015 | McNally | |
| 9,286,591 B2 | 3/2016 | Lehner et al. | |
| 9,747,651 B2 | 8/2017 | McNally | |
| 10,162,685 B2 | 12/2018 | Ristock et al. | |
| 10,318,914 B1 | 6/2019 | Arora et al. | |
| 10,970,797 B2 | 4/2021 | McNally | |
| 11,276,130 B2 | 3/2022 | McNally | |
| 11,842,415 B2 | 12/2023 | McNally | |
| 11,847,587 B1 | 12/2023 | McNally | |
| 12,327,217 B2 | 6/2025 | Gupta et al. | |
| 2002/0128915 A1 | 9/2002 | Haseltine | |
| 2005/0114221 A1 | 5/2005 | Walters et al. | |
| 2006/0149577 A1* | 7/2006 | Stashluk, Jr. | ........ G06Q 30/016 705/13 |
| 2010/0131420 A1* | 5/2010 | Williams | ............. G06Q 10/083 715/810 |
| 2010/0325698 A1 | 12/2010 | Ginter et al. | |
| 2011/0251990 A1 | 10/2011 | Yarvis et al. | |
| 2013/0173490 A1 | 7/2013 | Shroff et al. | |
| 2014/0229338 A1 | 8/2014 | Borders et al. | |
| 2014/0249937 A1 | 9/2014 | McNally | |
| 2015/0154559 A1* | 6/2015 | Barbush | .......... G06Q 10/08355 705/338 |
| 2015/0294265 A1 | 10/2015 | Monteverde | |
| 2015/0310387 A1 | 10/2015 | Friedman et al. | |
| 2016/0098669 A9 | 4/2016 | Kantarjiev et al. | |
| 2016/0104112 A1 | 4/2016 | Gorlin | |
| 2016/0349067 A1 | 12/2016 | Fowe | |
| 2017/0323545 A1* | 11/2017 | Gillen | ............... G06Q 10/0631 |
| 2018/0075407 A1* | 3/2018 | Chivukula | ......... G06Q 10/0834 |
| 2018/0082252 A1 | 3/2018 | Wilkinson et al. | |
| 2018/0107977 A1 | 4/2018 | McHale et al. | |
| 2018/0276739 A1 | 9/2018 | Chopp | |

| | | | |
|---|---|---|---|
| 2019/0005449 A1 | 1/2019 | Smith et al. | |
| 2019/0073631 A1 | 3/2019 | Ferguson et al. | |
| 2019/0220273 A1* | 7/2019 | Ye | ....................... G06F 9/44505 |
| 2019/0228377 A1* | 7/2019 | Pande | ............. G06Q 10/06315 |
| 2019/0367278 A1 | 12/2019 | Bellar et al. | |
| 2020/0074526 A1 | 3/2020 | Bikumala et al. | |
| 2020/0082334 A1 | 3/2020 | Dotterweich et al. | |
| 2020/0193371 A1* | 6/2020 | Jean-Charles | ..... G06Q 10/0833 |
| 2021/0256472 A1 | 8/2021 | Javidan et al. | |
| 2022/0083969 A1 | 3/2022 | Deluca et al. | |
| 2022/0092535 A1 | 3/2022 | Silverstein et al. | |
| 2022/0147927 A1 | 5/2022 | Kieboom et al. | |
| 2022/0230135 A1* | 7/2022 | Burris | .................. G06Q 10/087 |
| 2022/0270040 A1 | 8/2022 | Kieboom et al. | |
| 2023/0004709 A1* | 1/2023 | Spirig | ............... G06Q 10/0635 |
| 2023/0245037 A1 | 8/2023 | Zhao et al. | |
| 2023/0281690 A1* | 9/2023 | Fort | ................... G06Q 30/0631 705/26.7 |
| 2024/0005265 A1 | 1/2024 | Gupta et al. | |

OTHER PUBLICATIONS

"Civil Action No. 2:23-CV-2165-WSH", Amended Complaint for Patent Infringement—*Ameranth, Inc.*, Plaintiff, V. *Doordash, Inc.*, Eat'n Park Restaurants, LLC, and Eat'n Park Hospitality Group, Inc., Defendants, Sep. 17, 2024, pp. 1-91.

U.S. Appl. No. 18/145,942, filed Dec. 23, 2022.

U.S. Appl. No. 18/345,969 , Non-Final Office Action, Mailed on Mar. 14, 2024, 30 pages.

U.S. Appl. No. 18/345,969 , Final Office Action, Mailed on Oct. 21, 2024, 29 pages.

U.S. Appl. No. 18/345,179 , Final Office Action, Mailed on Jan. 3, 2025, 34 pages.

U.S. Appl. No. 18/345,179 , Non-Final Office Action, Mailed on Jun. 21, 2024, 33 pages.

U.S. Appl. No. 18/345,179 , Non-Final Office Action, Mailed on May 29, 2025, 33 pages.

U.S. Appl. No. 18/345,969 , Notice of Allowance, Mailed on Feb. 12, 2025, 14 pages.

Tu et al., "OCD: Online Crowdsourced Delivery for On-Demand Food", Institute of Electrical and Electronics Engineers Internet of Things Journal, vol. 7, No. 8, Aug. 2020, pp. 6842-6854.

U.S. Appl. No. 18/345,179 , Notice of Allowance, Mailed On Dec. 17, 2025, 20 pages.

Muslu et al., "Improved Genetic Algorithm and Mobile Application for an Up-to-date Traveling Salesman Problem", Institute of Electrical and Electronics Engineers, 4th International Symposium on Multidisciplinary Studies and Innovative Technologies (ISMSIT), Oct. 22-24, 2020, pp. 1-7.

* cited by examiner

Figure 4A:
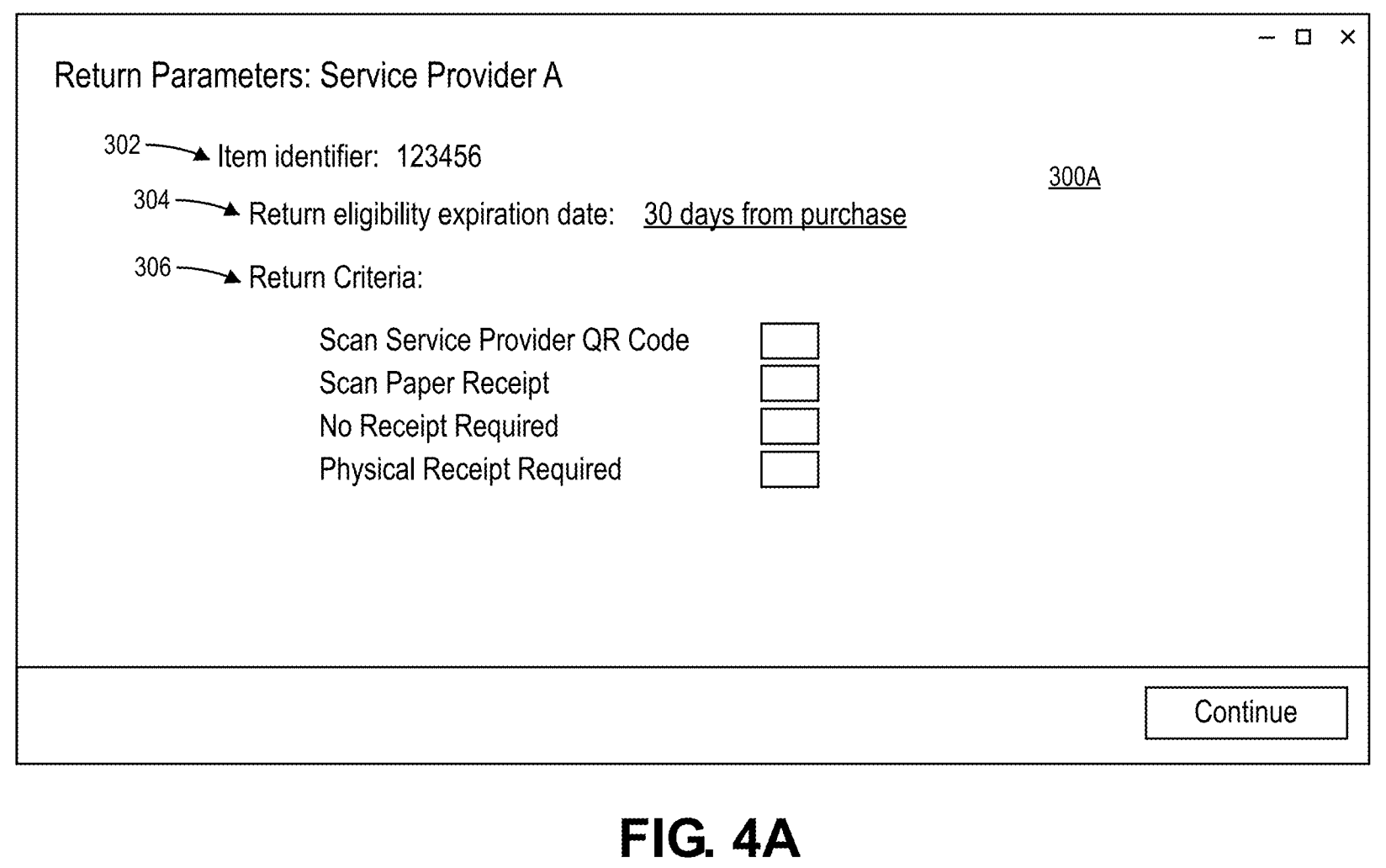

Return Parameters: Service Provider A

302 ➔ Item identifier: 123456

304 ➔ Return eligibility expiration date: 30 days from purchase

306 ➔ Return Criteria:

Scan Service Provider QR Code ☐

Scan Paper Receipt ☐

No Receipt Required ☐

Physical Receipt Required ☐

Figure 4B:
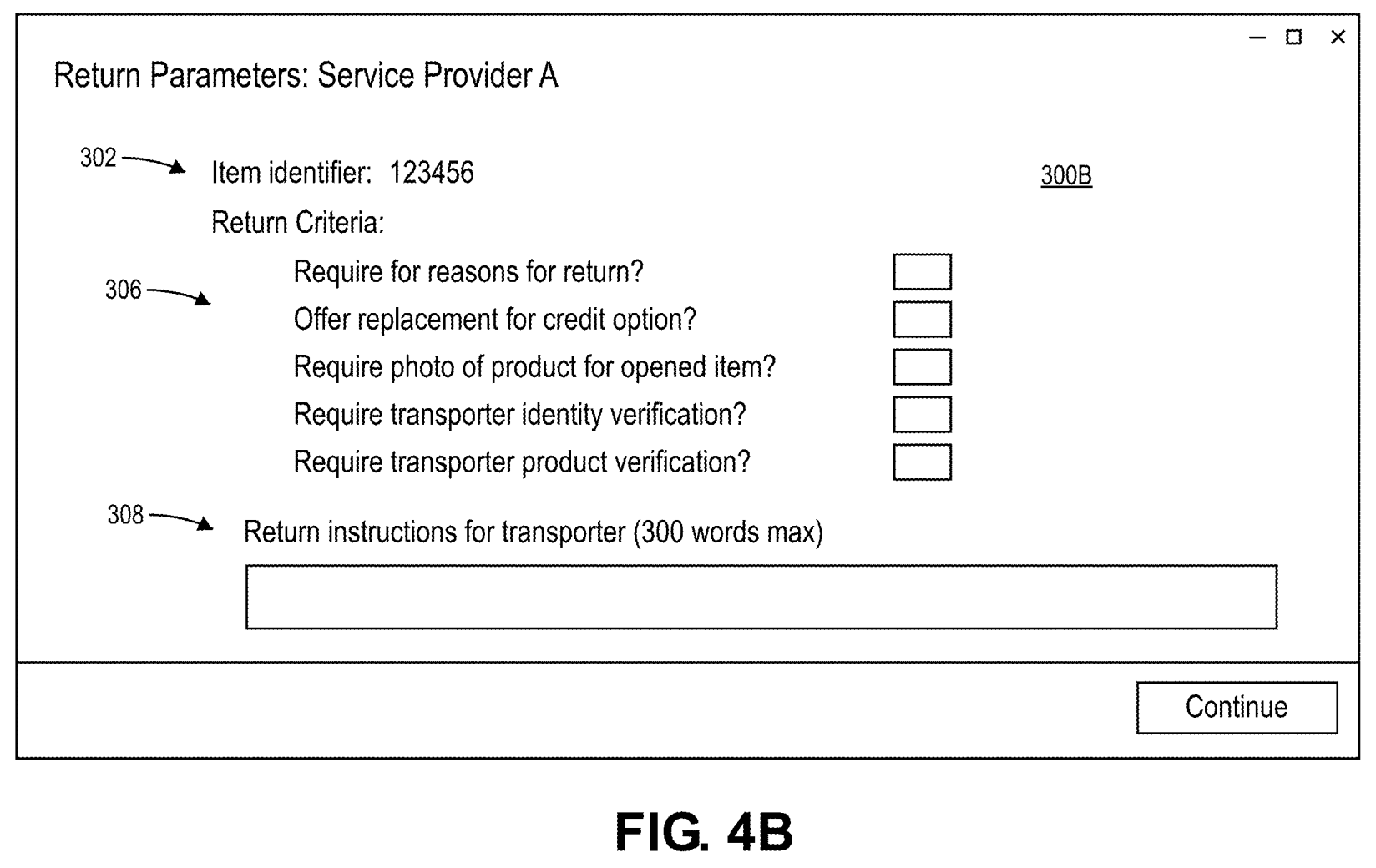

Return Parameters: Service Provider A

300B

302 → Item identifier:  123456

Return Criteria:

306 →
Require for reasons for return?

Offer replacement for credit option?

Require photo of product for opened item?

Require transporter identity verification?

Require transporter product verification?

308 → Return instructions for transporter (300 words max)

RECEIVE A RETURN REQUEST FROM
AN END USER
S540

PROVIDE RETRIEVAL MESSAGE TO
TRANSPORTER
S560

NOTIFY THE END USER THAT A
TRANSPORTER CAN PICK UP ITEM
S580

PERFORM ITEM VALIDATION
PROCESS
S584

DELIVER ITEM
S586

RECEIVE CONFIRMATION THAT ITEM
HAS BEEN DELIVERED
S590

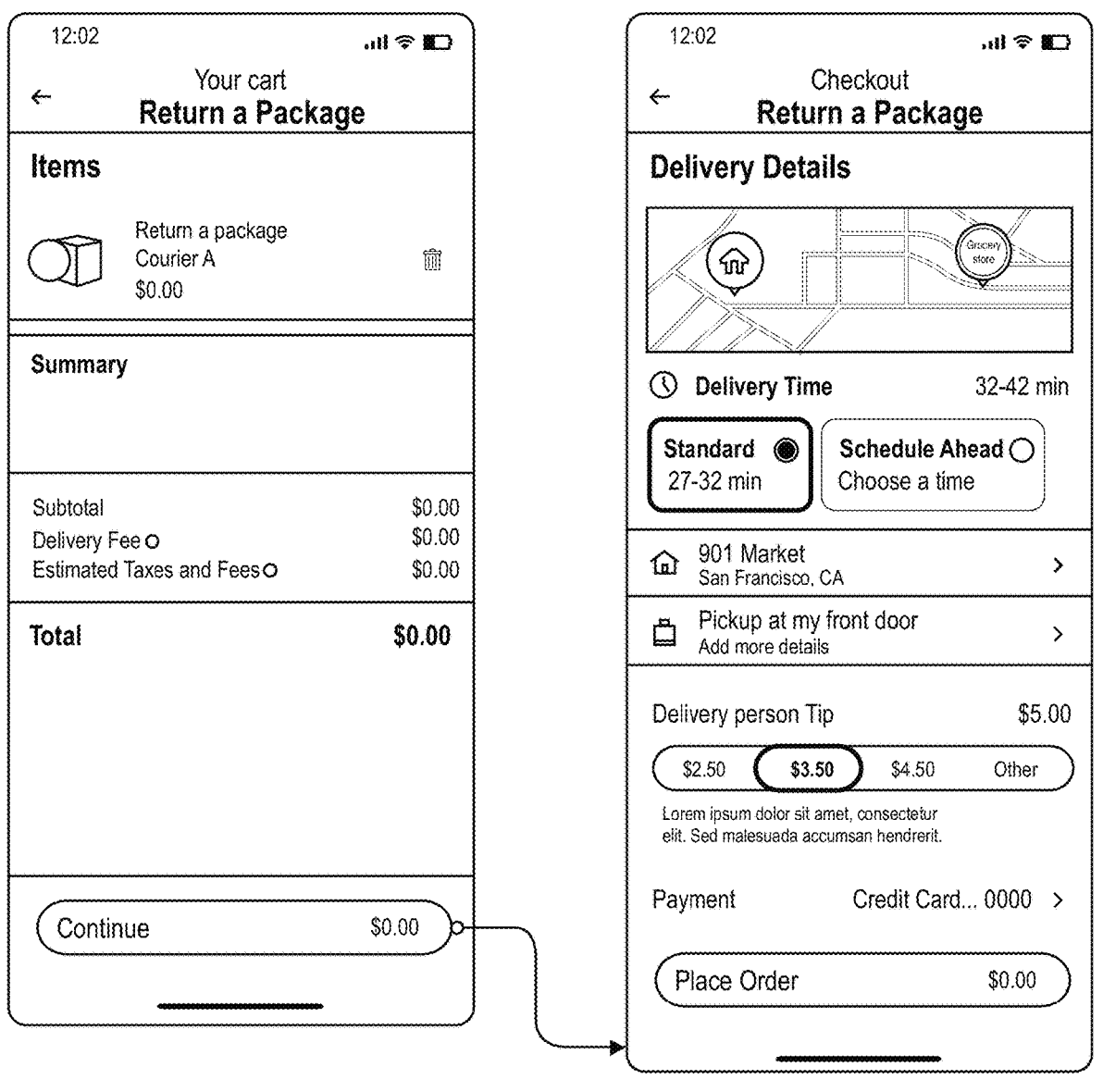
FIG. 6H            FIG. 6I

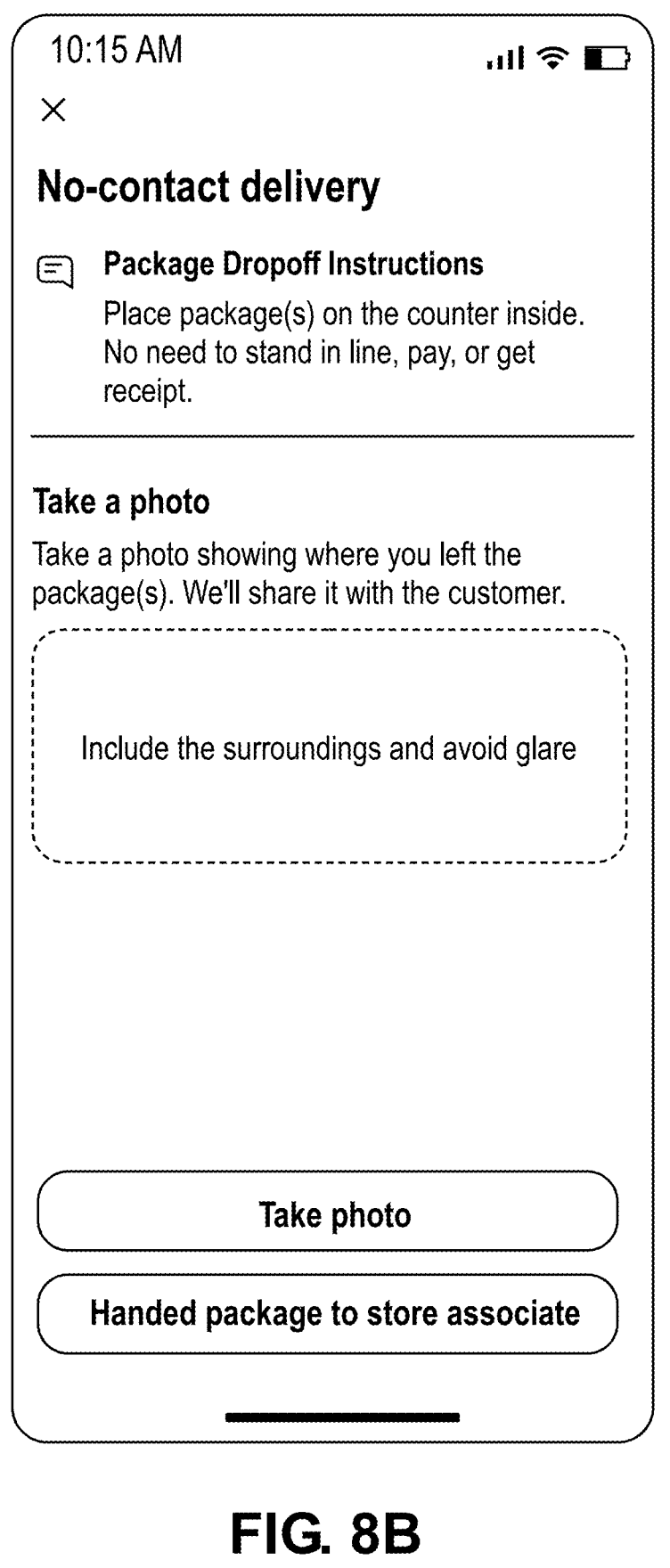

10:15 AM

✕

No-contact delivery

Package Dropoff Instructions

Place package(s) on the counter inside. No need to stand in line, pay, or get receipt.

Take a photo

Take a photo showing where you left the package(s). We'll share it with the customer.

Include the surroundings and avoid glare

Take photo

Handed package to store associate

FIG. 8B

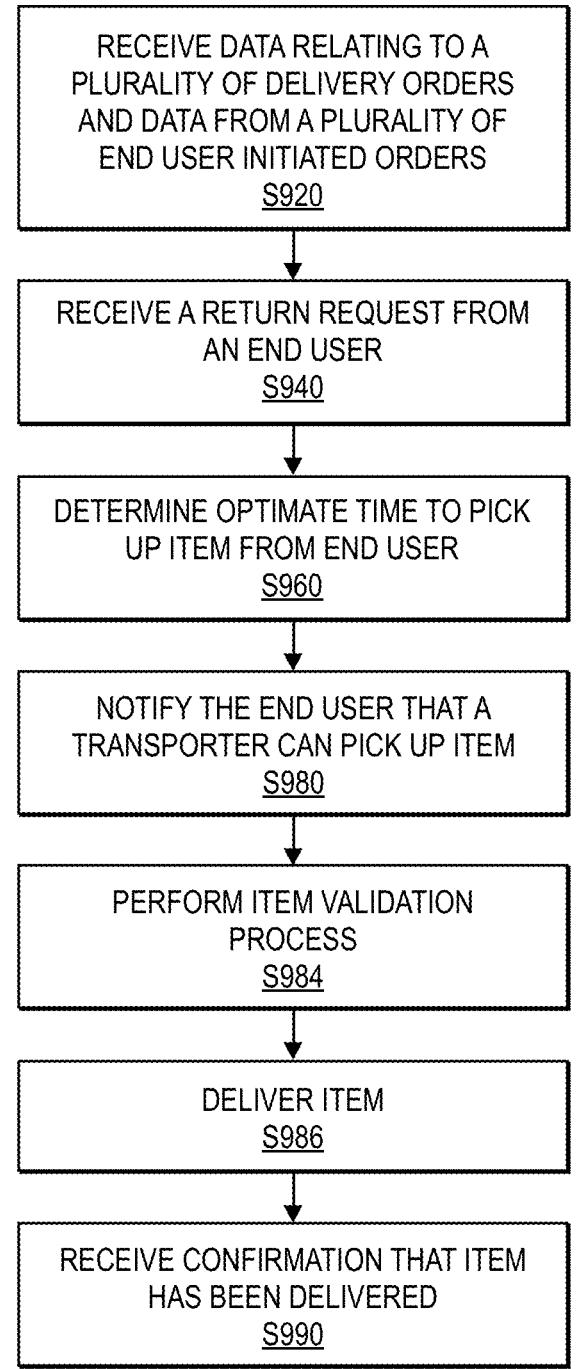

RECEIVE DATA RELATING TO A
PLURALITY OF DELIVERY ORDERS
AND DATA FROM A PLURALITY OF
END USER INITIATED ORDERS
S920

RECEIVE A RETURN REQUEST FROM
AN END USER
S940

DETERMINE OPTIMATE TIME TO PICK
UP ITEM FROM END USER
S960

NOTIFY THE END USER THAT A
TRANSPORTER CAN PICK UP ITEM
S980

PERFORM ITEM VALIDATION
PROCESS
S984

DELIVER ITEM
S986

RECEIVE CONFIRMATION THAT ITEM
HAS BEEN DELIVERED
S990

FIG. 9

SCALABLE AND EFFICIENT PACKAGE DELIVERY USING TRANSPORTER FLEET

CROSS REFERENCE TO RELATED APPLICATIONS

This application is a non-provisional application of U.S. Provisional Application No. 63/357,452, filed on Jun. 30, 2022, and U.S. Provisional Application No. 63/357,444, filed on Jun. 30, 2022, both of which are herein incorporated by reference in their entirety for all purposes.

BRIEF SUMMARY

One embodiment of the invention includes providing, by server computer to a service provider computer, an onboarding interface for onboarding a service provider operating the service provider computer to accept returns of items initiated by end users and from a plurality of available transporters, wherein the onboarding interface is configured to receive selections of returns processing options from a plurality of service providers; receiving, by the server computer, one or more selections of the returns processing options from the service provider via the service provider computer via the onboarding interface; storing, by the server computer, the selected returns processing options; receiving, by the server computer, a return order for one or more items to the service provider from an end user; and processing, by the server computer, the return order according to the selected and stored returns processing options using a transporter.

Another embodiment can include a server computer comprising: a processor; and a computer readable medium coupled to the processor, the computer readable medium comprising code, executable by the processor, for implementing operations comprising: providing, to a service provider computer, an onboarding interface for onboarding a service provider operating the service provider computer to accept returns of items initiated by end users and from a plurality of available transporters, wherein the onboarding interface is configured to receive selections of returns processing options from a plurality of service providers; receiving one or more selections of the returns processing options from the service provider via the service provider computer via the onboarding interface; storing the selected returns processing options; receiving a return order for one or more items to the service provider from an end user; and processing the return order according to the selected and stored returns processing options using a transporter.

Another embodiment includes a method comprising: receiving, by a server computer, request from an end user of an item to deliver the item to a service provider; providing, by the server computer, a retrieval message to a transporter to travel to the end user to retrieve the item and determine if the item is suitable for return to the service provider; receiving, by the server computer, an item confirmation message from the transporter that the item is suitable for return to the service provider; and receiving, by the server computer, a delivery confirmation message from the transporter that the item was successfully delivered to the service provider.

Another embodiment includes a server computer comprising: a processor; and a non-transitory computer readable medium, the non-transitory computer readable medium comprising code, executable by the processor for performing operations comprising: receiving request from an end user of an item to deliver the item to a service provider; providing a retrieval message to a transporter to travel to the end user to retrieve the item and determine if the item is suitable for return to the service provider; receiving an item confirmation message from the transporter that the item is suitable for return to the service provider; and receiving a delivery confirmation message from the transporter that the item was successfully delivered to the service provider.

Another embodiment includes a method comprising: receiving, by a server computer, data relating to a plurality of delivery orders from service providers to end users, and data relating to a plurality of end user initiated orders from end users to service providers; receiving, by the server computer, a return request from an end user to deliver an item to a service provider, the return request allowing the server computer to determine an optimal time to pick up the item from the end user and deliver the item to the service provider; notifying, by the server computer, the end user that a transporter can pick up the item from the end user and deliver the item to the service provider; and receiving, a delivery confirmation message from the transporter that the item has been delivered to the service provider.

Further details regarding these and other embodiments can be found in the Detailed Description and the Figures.

BRIEF DESCRIPTION OF THE DRAWINGS

FIGS. 4A-4B show illustrations of parts of an onboarding interface according to embodiments.

FIGS. 6A-6I show illustrations of user interfaces that can be presented to an end user via an end user device when placing a return order with the server computer.

FIGS. 8A-8C show illustrations of user interfaces that can be presented to a transporter via a transporter user device during a returns process.

FIG. 9 shows a flowchart illustrating method according to another embodiment.

DETAILED DESCRIPTION

Figure 1:
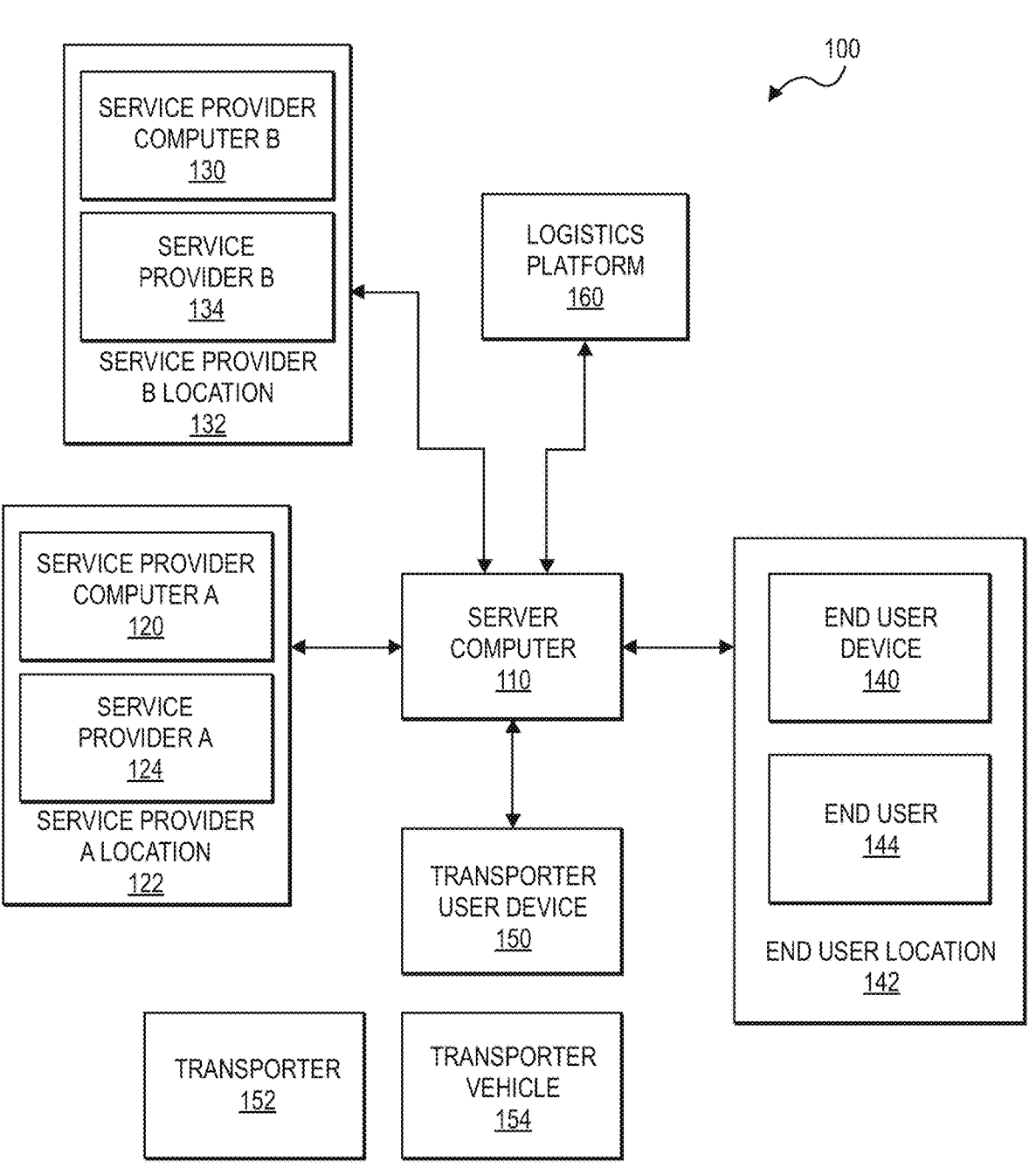
FIG. 1 shows a block diagram of a system according to embodiments.

Prior to discussing embodiments of the invention, some terms can be described in further detail.

A "user" may include an individual or a computational device. In some embodiments, an end user may be associated with one or more personal accounts and/or user devices.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device (e.g., a mobile phone), a laptop or desktop computer, a wearable device (e.g., smartwatch), etc.

A "transporter" can be an entity that transports something. A transporter can be a person that transports a resource using a transportation device such as a vehicle (e.g., a car). In other embodiments, a transporter can be a transportation device that may or may not be operated by a human. Examples of transportation devices include cars, boats, scooters, bicycles, drones, airplanes, etc.

A "return order" can be a request to return an item previously obtained by an end user to another entity such as a service provider. In some embodiments, a return order can be associated with a return of an item purchased by an end user from a service provider such as a merchant. The end user may be unsatisfied with the purchased item or may otherwise wish to return it to the service provider for a refund, credit, or replacement of the item.

A "fulfillment request" can be a request to provide a resource in response to a request. For example, a fulfillment request can include an initial communication from an end user device to a server computer for a first service provider computer to fulfill a purchase request for a resource such as food. A fulfillment request can be in an initial state, a comprising data completed state, or a final state. After the fulfillment request is in a final state, it can be accepted by the server computer, and the server computer can send a fulfillment request confirmation to the end user device. A fulfillment request can include one or more selected items from a selected service provider. A fulfillment request can also include user features of the end user providing the fulfillment request.

An "item" can include an individual article or unit. An item can be an object that is provided by a service provider. Items can be a perishable or non-perishable goods. For example, items can include food items (e.g., pizza, hamburgers, French fries, etc.), clothing, electronics, etc.) An item can be an object that is delivered from a service provider location to an end user location (or vice-versa) by a transporter.

A "server computer" can include a powerful computer or cluster of computers. For example, the server computer can be a large mainframe, a minicomputer cluster, or a group of servers functioning as a unit. In one example, the server computer may be a database server coupled to a Web server. A server computer can also include a cloud computer.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" can include any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

The United States Postal Service handled 72 million package returns in 2020 alone, and several ecommerce marketplaces experience a 10% return rate on orders. A quarter of end users (e.g., consumers) return between 5% and 15% of items that they purchase online and is a major friction point for end users. To successfully return an item, the consumer must return, re-package, route the package, and ensure that they receive a refund. Routing the package is often the most frustrating step for the consumer to return the item. For example, an ecommerce platform may require that the consumer to go to the post office to mail the package to a return location, or to drop-off the package at the return location themselves. Return services (e.g., offered by a package transporter or a courier that picks up and routes a package on behalf of a consumer) have not been efficient in alleviating issues that end users have with returns.

A number of problems exist with respect to delivering returned items to service providers. For example, different service providers can have different return procedures and requirements, and these procedures and requirements may differ by item. For example, one service provider can have a return policy that requires that a returned item (e.g., a television) not have any damage before a refund can be processed. This policy may not apply with respect to an item (e.g., cups) that does not have the ability to function on its own (e.g., detergent). Further, one service provider may not require a receipt to process a refund for a return, while another service provider may require a receipt to process a return. Because of all of these specific requirements and policies, scalable and convenient returns processing is not possible using conventional systems.

In addition, some service providers may have very specific procedures when processing refunds, and end users may have difficulty executing these procedures. As a result, even if a courier could deliver a package with a returned item to a service provider, the end user may not have followed the service provider's procedures. For example, a service provider may require that a returned item be in its original packaging and that a copy of a paper receipt accompany the returned item before the end user could be refunded for the purchase of the returned item. The end user may not have been aware of these procedures, and may have attempted to return the item without following one or more of the service provider's procedures. As a result, the refund for the returned item may not be processed, and the end user that purchased the item would need to retrieve the item from the service provider. This is a barrier to the widespread use of delivery services to return items for end users to service providers. It is also time-consuming and inefficient. As noted above, if millions of packages with returned items are transported every year, and a small percentage of those fail to comply with the service providers' return procedures, then this can result in millions of unnecessary additional deliveries that ultimately do not result in the users obtaining their refunds.

Embodiments of the invention address these and other problems, individually and collectively.

FIG. 1 shows a system 100 according to embodiments. The system 100 includes a server computer 110 in communication with an end user device 140 operated by an end user 144 at an end user location 142 (e.g., a home of an end user). A transporter user device 150 (e.g., a mobile phone) operated by a transporter 152 may also be in communication with the server computer 110. The transporter 152 can operate a transporter vehicle 154 such as a car to deliver items between end users and service providers. Although one transporter 152 and one end user 144 are illustrated in FIG. 1 for ease of illustration, it is understood that the system can include many transporters and their transporter user devices and transporter vehicles. The system can also include many end users and their end user devices at their end user locations.

The end user device 140 can include a device operated by the end user 144. The end user device 140 can generate and provide return request messages to the server computer 110 to request the return or delivery of one or more items from the end user 144 operating the end user device 140 to a service provider A 124 at a service provider A location 122. The end user device 140 can also generate and provide fulfillment request messages to the server computer 110 to request the delivery of one or more items from the service provider A 124 at the service provider A location 122.

A fulfillment request message can indicate that the request (e.g., a request for a service) can be fulfilled by one or more service providers A, B 124, 134. For example, in some embodiments, the fulfillment request message can be generated based on a cart selected at checkout during a transaction using a fulfillment application installed on the end user device 108. The fulfillment application can be a delivery application, and the server computer 110 can include an application server computer that manages the interactions with the delivery application. The fulfillment request message can include one or more items from the selected cart.

A returns request message may indicate that one or more items are to be returned to a specific service provider such as the service provider A 124. The server provider 124 could be a retailer, a delivery service, a restaurant, a courier service, etc.

In some embodiments, the server computer 110 can receive a fulfillment request message and a returns request message from the same end user 144 operating the end user device 140. The fulfillment request message can result in the end user 144 receiving one or more items from one service provider (e.g., service provider A 124) using the transporter 152, and then returning one or more other items to a different service provider (e.g., service provider B 134) using the same transporter 152. For example, service provider A 124 may be a restaurant and service provider B 134 may be department store. The end user 144 can submit a fulfillment request to the server computer 110 to obtain a pizza from service provider A 124. The transporter 152 can travel from the service provider A location 122 to the end user location 142 using the transporter vehicle 154 to deliver the pizza to the end user 144. When the transporter arrives at the end user location 142, the transporter 152 can retrieve an item to be returned by the end user 144 to service provider B 134. The item may be, for example, a vacuum cleaner and the transporter 152 can perform any requested actions associated with the return of the item. For example, the transporter 152 can check to see that the vacuum cleaner is operational and that all of the parts are present. The transporter 152 can then deliver the item from the end user location 42 to the service provider B location 132. Once the transporter 152 arrives at the service provider B location 132, the transporter 152 can perform any requested actions to facilitate the return. For example, the transporter 152 may have received a barcode or receipt from the end user 144. The transporter 152 may present the receipt to the service provider B 134 so that the service provider B can refund of the purchase of the item to the end user 144.

The transporter user device 150 can be a device operated by a transporter. The transporter user device 150 can include smartphones, wearable devices, personal assistant devices, etc.

In embodiments of the invention, the transporter 152 can accept a request to return an item from end user to a service provider A, B 124, 134. For example, the server computer 110 can send a notification of the return request to the transporter user device 150. The transporter user device 150 can generate and transmit an acceptance to fulfill the end user's return request to the server computer 102.

The transporter 152 can also accept the request to fulfill an end user's fulfillment request or delivery request. For example, the transporter user device 150 can generate and transmit an acceptance to fulfill a particular end user's fulfillment request to the server computer 102. The server computer 110 can notify the transporter user device 150 of the fulfillment request. The transporter user device 150 can respond to the server computer 110 with a request to perform the delivery to the end user 144 as indicated by the fulfillment request.

The server computer 110 may also be in communication with a logistics platform 160. The logistics platform 160 can include a location determination system, which can determine the location of various user devices such as transporter user devices (e.g., transporter user device 150) and end user devices (e.g., end user device 140). The logistics platform 160 can also include routing logic to efficiently route transporters using the transporter user devices 150 to various service providers A, B 124, 134 to return items from end users to the service providers or deliver items from the service providers to the end users 144. The logistics platform 160 can be part of the server computer 110 or can be system that is separate from the server computer 110.

The logistics platform can have or be in communication with a navigation network, which can provide navigational directions to the one or more transporter user devices 150. For example, the transporter user device 150 can obtain a location from the server computer 110. The location can be a service provider parking location, a service provider location, an end user parking location, an end user location, etc. The navigation network can provide navigational data to the location. For example, the navigation network can be a global positioning system that provides location data to the transporter user device 150. In some examples, the navigation network can receive geographic information from the third-party mapping system. For example, the navigation network can receive additional geographic information associated with a location of a transporter or a location of an end user.

A plurality of service provider (A, B) computers 120, 130 operated by service providers 124, 134 at service provider (A, B) locations 122, 132, can also be in communication with the server computer 110. The service provider (A, B) computers 120, 130 can be two of many service provider computers which may communicate with the server computer 110 via one or more APIs. The service provider (A, B) computers 120, 130 may be operated by service providers A, B 124, 134 that can offer resources such as goods and/or services to end users, or receive returns of resources from the end users.

The communication networks that allow the entities in FIG. 1 to communicate may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

Figure 2A:
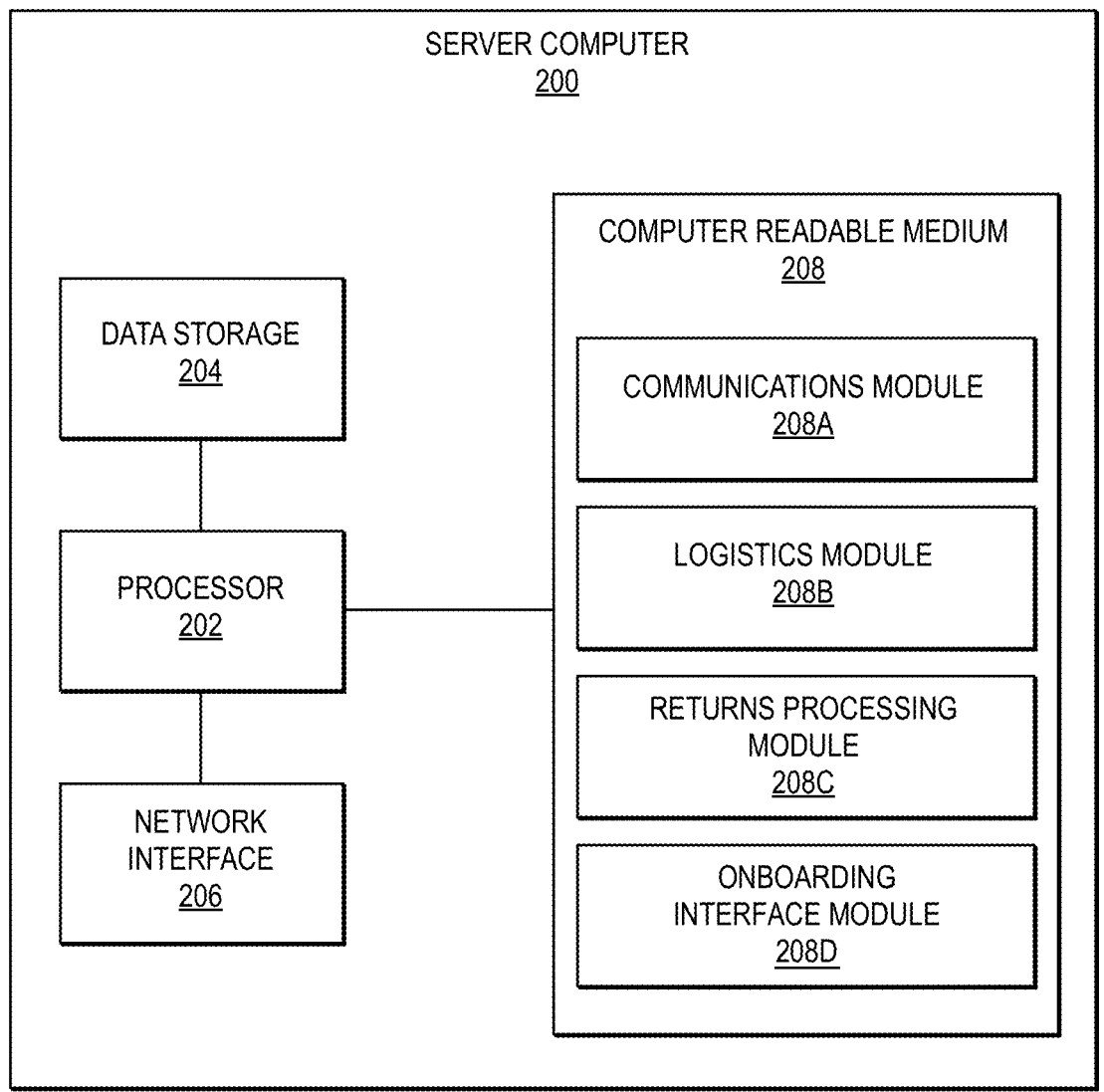
FIG. 2A shows a block diagram of a server computer according to embodiments.

FIG. 2A shows a block diagram of a server computer 200 according to an embodiment. The exemplary server computer 200 may comprise a processor 202. The processor 202 may be coupled to a data storage 204, a network interface 206, and a computer readable medium 208. The computer readable medium 208 can comprise a communications module 208A, a logistics module 208B, a returns processing module 208C, and an onboarding interface module 208D.

The data storage 204 can be used to store data and code. For example, the data storage 204 can store input data such as data relating to options for returns processing, returns options processing selections, service provider identifiers, etc. The data storage 204 may be coupled to the processor 202 internally or externally (e.g., cloud based data storage), and may comprise any combination of volatile and/or non-volatile memory, such as RAM, DRAM, ROM, flash, or any other suitable memory device. The data storage 204 can comprise a database such as a conventional, fault tolerant, relational, scalable, secure database such as those commercially available from Oracle™ or Sybase™.

The computer readable medium 208 may comprise code, executable by the processor 202, for performing a method comprising: providing, to a service provider computer, an onboarding interface for onboarding a service provider operating the service provider computer to accept returns of items initiated by end users and from a plurality of available transporters, wherein the onboarding interface is configured to receive selections of returns processing options from a plurality of service providers; receiving one or more selections of the returns processing options from the service provider via the service provider computer via the onboarding interface; storing the selected returns processing options; receiving a return order for one or more items to the service provider from an end user; and processing the return order according to the selected and stored returns processing options using a transporter.

The computer readable medium 208 may also comprise code, executable by the processor 202, for performing a method comprising: receiving request from an end user of an item to deliver the item to a service provider; providing a retrieval message to a transporter to travel to the end user to retrieve the item and determine if the item is suitable for return to the service provider; receiving an item confirmation message from the transporter that the item is suitable for return to the service provider; and receiving a delivery confirmation message from the transporter that the item was successfully delivered to the service provider.

The computer readable medium 208 may also comprise code, executable by the processor 202, for performing a method comprising: receiving data relating to a plurality of delivery orders from service providers to end users, and data relating to a plurality of end user initiated orders from end users to service providers; receiving a return request from an end user to deliver an item to a service provider, the return request allowing the server computer to determine an optimal time to pick up the item from the end user and deliver the item to the service provider; notifying the end user that a transporter can pick up the item from the end user and deliver the item to the service provider; and receiving a delivery confirmation message from the transporter that the item has been delivered to the service provider.

The communications module 208A may comprise code or software, executable by the processor 202, for communicating with one or more external devices such as service provider computers, end user devices, transporter user devices, third party mapping and logistics service computers, etc.

The logistics module 208B may comprise code or software, executable by the processor 202 for coordinating delivery or returns processing between transporters, service providers, and end users. The logistics module 208B and the processor 202 can determine optimal routes (e.g., optimum delivery times, optimal costs, and/or optimal efficiencies) for transporters to deliver or return items from various end users.

The returns processing module 208C may comprise code or software, executable by the processor 202 for performing functions and messaging relating to processing the return of items from end users to service providers. The returns processing module 208C and the processor 202 can coordinate returns or outbound deliveries to end users. The returns processing module 208C and the processor 202 can also execute actions (e.g., prompt end users or transporters to take pictures of receipts, items, etc.) in accordance with criteria configured by the service provider via the onboarding interface module 208D.

The onboarding interface module 208D and the processor 202 can allow service providers to set configurations for the processing of the returns of their items. The onboarding interface can allow service providers to set configurations for returns on a per item or per location basis. For example, a service provider may have one set of criteria for returning perishable goods such as dog food and another set of criteria for returning non-perishable goods such as a toothpaste. The service provider may also have one set of criteria for returning electronic devices vs. non-electronic devices. Examples of onboarding interfaces are shown in FIGS. 4A and 4B.

The network interface 206 may include an interface that can allow the server computer 200 to communicate with external computers. The network interface 206 may enable the server computer 200 to communicate data to and from another device (e.g., the logistics platform 160, the one or more service provider computers 120, 130, the end user device 140, the transporter user device 150, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 2B:
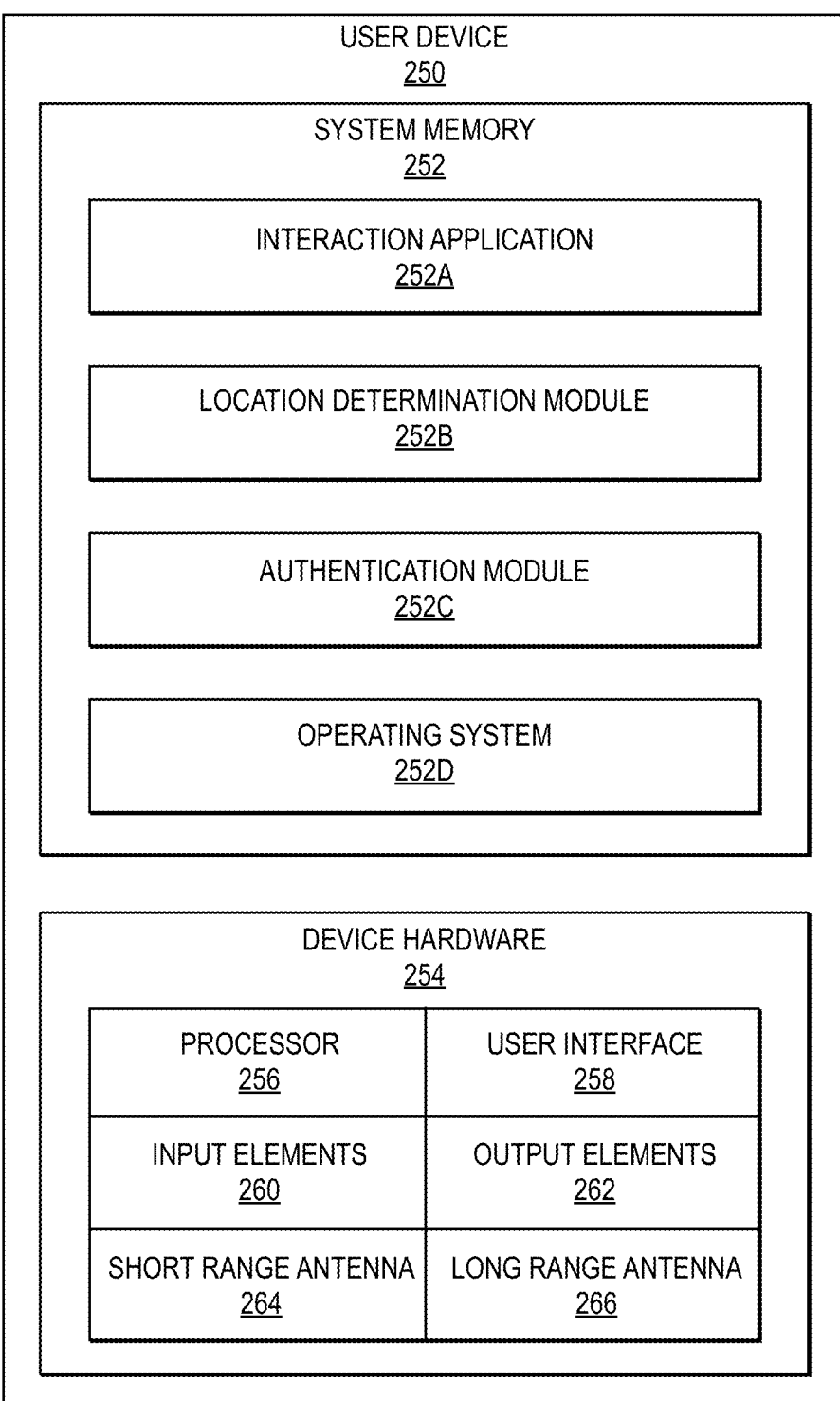
FIG. 2B shows a block diagram of a user device according to embodiments.

FIG. 2B shows a block diagram of a user device 250 according to embodiments. The user device 250 may include device hardware 254 coupled to a system memory 252. The user device 250 can be operated by an end user or a transporter.

Device hardware 254 may include a processor 256, a short range antenna 264, a long range antenna 266, input elements 260, a user interface 258, and output elements 262 (which may be part of the user interface 258). Examples of input elements may include microphones, keypads, touchscreens, sensors, etc. Examples of output elements may include speakers, display screens, and tactile devices. The processor 256 can be implemented as one or more integrated circuits (e.g., one or more single core or multicore microprocessors and/or microcontrollers) and is used to control the operation of mobile communication device 7. The processor 256 can execute a variety of programs in response to program code or computer-readable code stored in the system memory 252 and can maintain multiple concurrently executing programs or processes.

The long range antenna 266 may include one or more RF transceivers and/or connectors that can be used by the user device 250 to communicate with other devices and/or to connect with external networks. The user interface 258 can include any combination of input and output elements to allow a user to interact with and invoke the functionalities of the user device 250. The short range antenna 259 may be configured to communicate with external entities through a short range communication medium (e.g. using Bluetooth, Wi-Fi, infrared, NFC, etc.). The long range antenna 266 may be configured to communicate with a remote base station and a remote cellular or data network, over the air.

The system memory 252 can be implemented using any combination of any number of non-volatile memories (e.g., flash memory) and volatile memories (e.g. DRAM, SRAM), or any other non-transitory storage medium, or a combination thereof media. The system memory 252 may store computer code, executable by the processor 255, for performing any of the functions described herein.

The system memory 252 may also store an interaction application 252A, a location determination module 252B, an authentication module 252C, and an operating system 252D. The interaction application 252A may be a resource delivery and return application such as a food delivery or item delivery (and/or return) application. The location determination module 302B can be used to determine a location of the user device 250. The authentication module 252C may comprise code, executable by the processor 256, to authenticate a user. This can be performed using user secrets (e.g., passwords) or user biometrics.

The system memory 252 may also comprise a computer readable medium comprising, code executable by the processor 256 to perform suitable methods described herein.

Embodiments allow end users such as customers to return items purchased from service providers to the service providers without leaving their home. This would include pre-packaged returns of items to courier services (e.g., the U.S. Postal Service, FedEx™, UPS™, etc.) and (open box or unopen boxed) returns of items directly to service providers such as merchants. The returns may include the use of machine readable codes such as QR codes to facilitate the returns. The machine readable codes may encode information about the purchase of an item (e.g., the time and place of purchase, an identifier for the end user that purchased the item, the payment method used to purchase the item, an identifier for the item, etc.). The encoded information can be used to facilitate the rapid return of the item. In some embodiments, the returns may be integrated with deliveries (e.g., deliveries of food) to end users. The deliveries and returns can be made via a delivery application on a user device (e.g., an end user mobile phone).

Embodiments can include a system that allows service providers such as retailers to join a returns processing system that includes a server computer. The server computer can interact with a delivery application that can be present on user devices. Embodiments of the invention can include software and a uniform interface that can allow many different service providers (e.g., merchants) to configure the returns processing system so that return orders can be processed from end users according to their preferences or requirements. The software can have several functions including allowing service providers to set return eligibility criteria, allowing service providers to set validation procedures (e.g., how to validate a return and possibly provide an immediate), and allowing service providers to provide return procedures (e.g., how and where to return items once the items are at the service providers). The software according to embodiments of the invention can also allow service providers to be easily onboarded.

In embodiments of the invention, the service providers can provide return criteria by item or item type to the server computer. The service providers can submit a data structure with return eligibility data that includes return criteria categories, possible return options, and resulting outputs for each selection. The service providers can provide this information via an onboarding interface or a service provider portal. For example, a service provider can provide information such as the following: "Item ID #123456891; Category: Recency (How recently was this item purchased?); Options: (a) Less than 30 days ago, or (b) more than 30 days ago; Outputs: if (a), eligible for return, if (b) ineligible for return."

Embodiments can provide return information to an end user as they use their delivery application to return an item. This can include (1) item lookup functionality (e.g., as a customer searches for a specific item, they can find a corresponding item ID); and (2) return eligibility lookup functionality (e.g., map the item ID to the eligibility criteria mentioned above).

In addition to item eligibility, the end user's return order can be mapped to a return order validation process of the service provider that will receive the returned item. The return order validation process may include the use a physical receipt, a photo of a receipt, or a machine readable code such as a QR code. For example, a service provider can require an end user to provide the physical receipt for a past purchase of an item, a photo of the receipt, or a machine readable code (e.g., a QR code) before the service provider provides a refund or exchange item to the end user. In some embodiments, the transporter delivering the returned item or an employee of the service provider that receives the returned item can analyze the physical receipt or photo of the receipt to confirm that the item is one that can be returned. If the machine readable code is used to facilitate the return of the item, then it may be scanned by the employee using a service provider device to facilitate the return of the item.

In some embodiments, the transporter can obtain the machine readable code from the end user and the machine readable code can be used to create a shipping label. When the transporter arrives at the service provider location to return an item for the end user, the transporter can present the machine readable code to the employee of the service provider, and the employee can print a shipping label for the item, and affix the shipping label to the item for shipping. This is particularly advantageous in the event that the end user does not have ready access to a printer.

Beyond return order eligibility and validation, embodiments of the invention can create a flexible solution that provides large and small service providers (e.g., retailers) with the ability to customize return procedures and item drop off instructions. For example, using embodiments of the invention, a service provider can provide photos of a return center and/or directions to the return center to the server computer. The server computer can then provide them to the transporter to help them quickly locate the return center and deliver any returned items. In some cases, the return center can be a drop off location where the transporter can simply drop off returned items without waiting for an employee of the service provider to physically acknowledge receipt of the returned items. Other service provider drop off options can include curbside drop off of returned items or standard queuing at a checkout or return register at the service provider.

Embodiments can also facilitate the exchange of returned items with replacement items. Also, when returning items to a service provider, the transporter can obtain new items from the service provider. The server computer can re-dispatch the transporter to deliver the new items to other end users. This drop off and pick up procedure can boost routing efficiency.

Specific ways to boost routing efficiencies can be found in U.S. patent application Ser. No. 18/345,179 filed on Jun. 30, 2023, the same day as the present application, having the title "Efficient Same Day Package Return Routing With Distributed Fleet".

Figure 3:
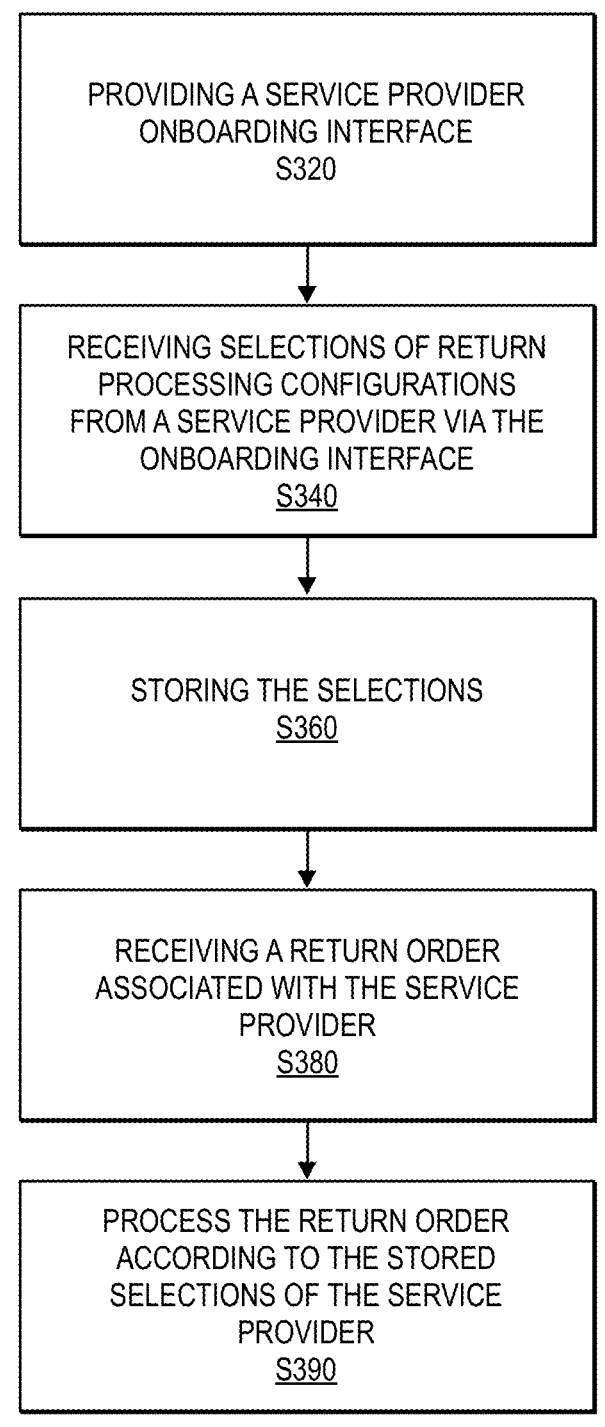
FIG. 3 shows a flowchart illustrating a method for onboarding a service provider to a server computer for returns order processing.

Methods for receiving data from a service provider via an onboarding interface can be described with respect to FIG. 3.

In an embodiment, referring to FIG. 3, in step S320, the method includes providing, by a server computer to a service provider computer, an onboarding interface for onboarding a service provider operating the service provider computer to accept returns of items initiated by end users and from a plurality of available transporters. The onboarding interface can be configured to receive selections of returns processing options from a plurality of service providers. returns processing options allow the service provider to set validation procedures. The validation procedures can include how and when an order is validated and how and when a refund is processed. The returns processing options can also allow the service provider to set return procedures.

FIGS. 4A-4B show illustrations of parts of an onboarding interface according to embodiments. The onboarding interface illustrates what a service provider may see when configuring the server computer to cause it to process returns to that service provider according to the preferences of the service provider.

FIG. 4A shows a user interface 300A which shows an item identifier data field 302, a return eligibility date data field 304, and return criteria data fields 306. The service provider can provide a description of an item (e.g., a UPC code, a name and model number, an in store code, etc.) to the server computer and the server computer can assign an item identifier to the item. The service provider can then enter a return eligibility date for the item. In this example, the service provider can enter a date such as "30 days from purchase." If any return is attempted past this time, the return will not be processed. The return criteria data fields 306 can contain options for the service providers to select to configure the server computer to implement service provider specific item return process for the service provider. For example, the service provider can require that a QR code, a scanned paper receipt, or a physical receipt is required before a refund can be processed. Other criteria may specify what types of items can be returned. For example, perishable items such as food may not be returnable, but non-perishable items such as electronics may be returnable.

FIG. 4B shows a user interface 300B with the item identifier data field 302, additional returns criteria data fields 306, and a return instructions data field 308. The additional return criteria data field may specify tasks that are to be performed during a return process. For example, some exemplary tasks that may be performed to facilitate the return process for an item may include transporter verification that a returned item works (e.g., a laptop computer to be returned can turn on) or that the returned item has not been damaged by the user (e.g., severely scuffed soles on shoes to be returned). The return instructions data field 308 can allow a service provider to provide return instructions to a transporter. The returns instructions can include directions to a return center at the service provider or instructions on who to contact once the transporter arrives at the service provider.

After the service provider computer receives the onboarding interface, the service provider can make one or more selections of the displayed returns eligibility criteria, processing options, and/or validation criteria to configure returns processing for the service provider.

In step S340, the server computer receives one or more selections of the returns processing options from the service provider via the service provider computer via the onboarding interface.

In step S360, the server computer stores the selected returns processing options in a database. The selected returns processing options can be stored in the database in association with an item identifier and/or the service provider location identifier. This information along with the returns processing options for other items can be stored in association with a service provider identifier for the service provider. Thus, for a single service provider, the same or different returns processing can occur for different items sold by the service provider.

At some point in time, an end user that purchased one or more items from the service provider can attempt to return the item to the service provider using a transporter that is associated with the server computer. The user may use an application on the end user device to provide information regarding the return to the server computer. A return order can be transmitted from the end user device to the server computer.

In step S380, the server computer can also receive the return order for one or more items to the service provider from an end user device of the end user.

In step S390, after receiving the return order for the one or more items, the server computer can process the return order according to the selected and stored returns processing options. A transporter can process the return orders according to the stored and selected options. Processing the return order can include sending an offer to return the one or more items from the end user to the service provider to a plurality of transporter user devices operated by a plurality of transporters, and then notifying the end user once a transporter has accepted the offer to return the one or more items. Processing the return order can also include providing information to the transporter so that the transporter can transport the one or more items from the end user to the service provider. Such information can include specific instructions regarding any item validation procedures that are to be performed by the transporter, any specific instructions that the transporter needs to undertake at the service provider location (e.g., show the receipt to the store clerk), the most efficient paths or routes to the end user and/or the service provider, processing a refund on behalf of the service provider, etc.

Further details regarding the processing of return orders are described below.

In the processing of the return of one or more items, the server computer can use various pieces of information to ensure that the returns are successful and efficient. A first piece of information may include item retrieval details such as date and time that an item to be returned to a service provider is to be retrieved from an end user. Other retrieval details can include any pickup preferences or instructions. For example, an end user may prefer that the transporter inform the end user about 15 minutes prior to arriving at the end user's location. A second piece of information can include drop off details such as the service provider name, the service provider location, and return instructions once an item is delivered to the service provider. A third piece of information can include information about the item to be returned. This can include a description of the type of item being returned, the item's weight, a photo of the item, etc. A fourth piece of information can include information that can be used to facilitate the return of an item. Such information may include a receipt, a machine readable code encoding details of the return or the item purchase, a prepaid shipping label, etc. A fifth piece of information may comprise return validation criteria. This can include information that can validate that the return will be processed. Return validation criteria can include ensuring that the return is being conducted within a valid period for returns (e.g., less than 30 days), that the item being returned is in good condition and/or operational, etc. Return validation criteria can be applied by the server computer, the transporter, the service provider or the end user. If applied by the end user or a transporter, then a confirmation from the end user or the transporter that all return criteria have been met can be received by the server computer.

In embodiments, the end user can select a type of return that they are attempting to initiate. For example, a first type of return could be to return a packaged item to a shipping service such as the U.S. Postal Service. A second type of return can include a return of an item purchased through a delivery application programmed to coordinate the delivery of items to end users. A third type of return would be the return of an item that was purchased at a service provider without using the delivery application, but where the service provider has an affiliation with an entity that operates the above-described delivery application. A fourth type of return would be a return of an item that was purchased a service provider that has no relationship with the entity that operates the above-described delivery application.

For all of the above-described types of returns, the pickup details can vary. The pickup date and time can be a scheduled window or a specific time. The pickup details can also be tied to a particular delivery of an item to an end user. Pickup preferences can include instructions such as "Pick up the package from my doorstep" or "I will hand the package to you." It if is helpful, other pickup instructions can be provided to the transporter.

For the first type of package return to a shipping service such as the U.S. Postal Service, the drop off details can include a selection of the shipping provider. The package information may include the type of container (e.g., box) used to return the item and the package's weight and/or size, and a photo of the container. The return facilitation can include confirming that the box is properly sealed and labeled for shipping, or submitting a machine readable code such as a QR code that can help process the return (for online returns such as via Amazon.com). The machine readable code can be shared with the transporter to help the transporter complete the delivery of the package without the use of a conventional return label. Criteria validation can include confirmation that the package does not include something undeliverable. This includes restricted or illegal material.

For the second type of return that can include a return of an item purchased through a delivery application programmed to coordinate the delivery of items to end users, the drop off details and the package information can be auto-filled into the delivery application on the end user's end user device and/or the transporter's user device. The return facilitation can include a receipt machine readable code (QR code) associated with the return. The end user can elect to receive a refund or an item delivery credit. For criteria validation, the server computer can provide the return criteria (date since purchase, quality of the items, packaged vs. unpackaged, etc.) and the end user can confirm that the items they plan to return meet those criteria. The delivery application and the server computer can deny the refund request when it is ineligible (e.g., past the time limit for returns).

For the third type of return for an item that was purchased at a service provider without using the delivery application, but where the service provider has an affiliation with an entity that operates the above-described delivery application, the drop off details may include a selection of the service provider to which the item is to be delivered. The package information details may include the name, model number, and/or serial number of the product, the size and weight of the product, a photo of the product, etc. For the return facilitation, the server computer can request that an end user submit a receipt for any items not purchased with the entity operating the server computer. In some cases, this can be just a photo of the barcode of the receipt. In others the physical receipt may be required (depending on the requirements of the partner service provider). In some cases, the end user can elect a refund by default. For criteria validation, the entity operating the server computer can surface the return criteria (e.g., date since purchased, the quality of the items, packaged vs. unpackaged, etc.). The end user can confirm that the items that they intend to return meet these criteria.

For the fourth type of return of an item that was purchased a service provider that has no relationship with the entity that operates the above-described delivery application, the drop off details may include a selection of the service provider to which the item is to be delivered. The package information details may include the name, model number, and/or serial number of the product, the size and weight of the product, a photo of the product, etc. For the return facilitation, the end user can attach a photo of the receipt or say that they will attach the original receipt to the box or container of the items to return. They confirm that they believe this will be sufficient to process the return and agree to bear liability of a return trip in case the return is unsuccessful. The end user can also elect a refund by default. For criteria validation, the entity operating the server computer can ask end users to confirm that the items meet the return criteria of the service provider that will receive the return. They can also confirm that their items meet these criteria and agree to bear liability of a return trip in case the return is unsuccessful.

In some embodiments, the server computer operating the delivery application can ensure that transporters can pick up the item (which may be packaged, sealed or unsealed) and conduct a validation process to confirm that the item is eligible for return.

First, the package is obtained by a transporter. If the end user elects "pick up at doorstep," then the server computer can tell the transporter about this mode of pickup along with details about the package (box type, weight, size) and a photo if available. If the end user elects "I'll hand it to you," then the server computer can tell the transporter about this mode of pickup along with details about the item to be returned. The transporter can ring the doorbell or knock on the door of the end user's home to obtain the package from the end user.

Then, the transporter is asked to perform a validation process for the item to ensure that it is returnable. For example, the transporter can check the date on a purchase receipt for the item and can determine if the requested return is past an expiration date (e.g., 90 days after an item is purchased). In another example, a photo could be taken of the item as proof of pickup. If the service provider is a partner retailer, then the end user can be shown the criteria for acceptable returns, and the server computer can ask the transporter to complete a check against the criteria (e.g., "item meets the return criteria, "does not meet the return criteria," or "cannot tell if item meets the return criteria"). The server computer can also ask the transporter via the transporter's user device to resolve any issues or discrepancies with the end user before continuing with the return. The transporter can also confirm that there is a purchase receipt or shipping label on the item (if one is required). The shipping label can be produced using an application on the end user's user device, or it may be on a box holding the returnable item. In the case where this is not present, the server computer may ask the transporter to resolve the issue with the customer before continuing with the order.

This approach can ensure the scalability to offer the return service to all service providers and shipping providers near an end user's location.

A transporter can also validate that an item is returnable by determining that the item is properly packaged (e.g., sealed) prior to performing the return, and take pictures of the item or package that it is in at the end user's location and at the service provider's location. Using such procedures, the end user can have confidence that they will receive their refund for the returned item. The system can also be designed so that the transporter is not responsible or liable for the quality of the item being returned. For example, the transporter can take a picture of the sealed box at pickup and delivery to prove that the transporter's delivery of the item back to the service provider did not alter the contents (e.g., a returned item) of a delivery package.

Figure 5:
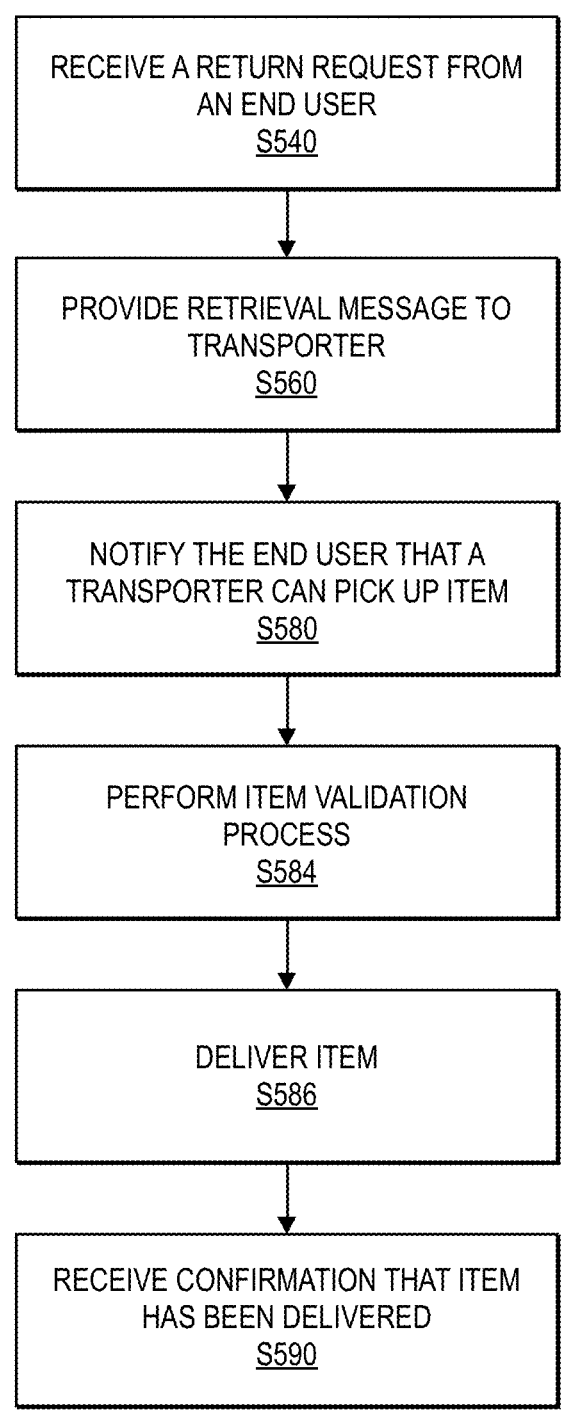
FIG. 5 shows a flowchart illustrating a method for performing returns processing according to selected returns processing options.

Referring to FIG. 5, a method for returning an item with transporter validation is illustrated. At some point in time, an end user that purchased one or more items from the service provider can attempt to return the item to the service provider using a transporter that is associated with the server computer. The user may use an application on the end user device to provide information regarding the return to the server computer. A return order can be transmitted from the end user device to the server computer.

In step S540, the server computer can receive the request from an end user of an item to deliver the item the service provider. The request may include a description of the item to be delivered to the service provider and/or confirmation that the item to be delivered meets certain package requirements (e.g., that the package is under a certain weight or size, that the package does not contain hazardous materials, etc.).

In step S560, after the server computer receives the request, the server computer can provide a retrieval message to a transporter user device operated by a transporter. The transporter may have accepted an offer to transport the item from the end user to the service provider. The retrieval message may include an instruction to the transporter to travel to the end user to determine if the item is suitable for return to the service provider. If it is suitable to return, then the instruction to the transporter can be to deliver the item to the service provider and process the return according to the instructions of the service provider or server computer.

In step S580, the server computer can notify the end user via the end user's user device that the transporter will pick up the item.

In step S584, the transporter, upon arriving at the end user's location, the transporter can perform an item or return validation process. For example, upon arriving at the end user's location, the transporter can inspect the item to ensure that it is suitable for a return. The transporter could, for example, inspect the item for any damage, ensure that the item is still operative (e.g., by turning on the power), etc. The transporter can also validate the item or return by checking a receipt associated with the retuned item, receiving a barcode from the end user or end user's user device, verifying that the package is properly packaged and has a shipping label, etc. Other item validation procedures are described above. After the transporter confirms that the item is suitable for a successful return, the transporter may use a transporter device to send an item confirmation message to the server computer confirming that the item is suitable for return. The server computer can then receive the item confirmation message from the transporter that the item is suitable for return to the service provider.

In step S586, the transporter can then deliver the item from the end user to the service provider. If the transporter operates a vehicle such as a car, the transporter can drive from the end user's location to the service provider's location.

In step S590, after the transporter delivers the item to the service provider, the transporter can then use the transporter's user device to provide a delivery confirmation message to the server computer indicating that the item was successfully delivered to the service provider (step S280).

FIGS. 6A-6F show user interfaces that can be associated with a delivery application on an end user's user device. The user interfaces may be presented to the end user on the end user's user device during a return process.

Figures 6A, 6B:
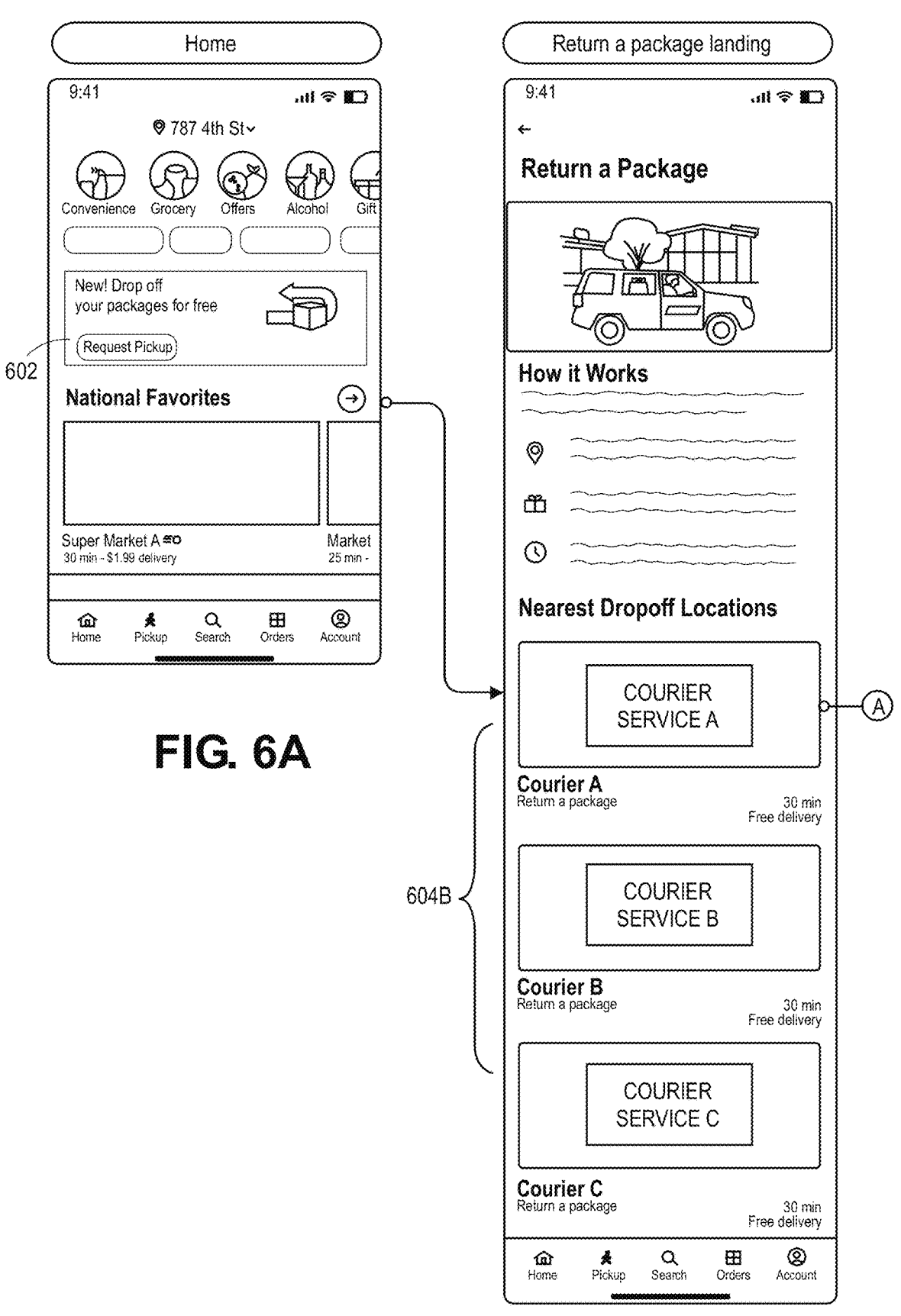

FIG. 6A shows a user interface illustrating an entry point banner 602 for an end user to select and initiate a return process to return an item to a service provider.

FIG. 6B shows a user interface that provides details on the return process. The user interface indicates that an end user can select a drop off location such as a service provider. The service provider can be a courier service such as FedEx or UPS, or a merchant. The user interface also provides instructions to leave the item for pickup by a transporter and the estimated time for delivery to the drop off location. The end user could select a drop off location of a nearby courier service, Courier Service A.

Figure 6C:
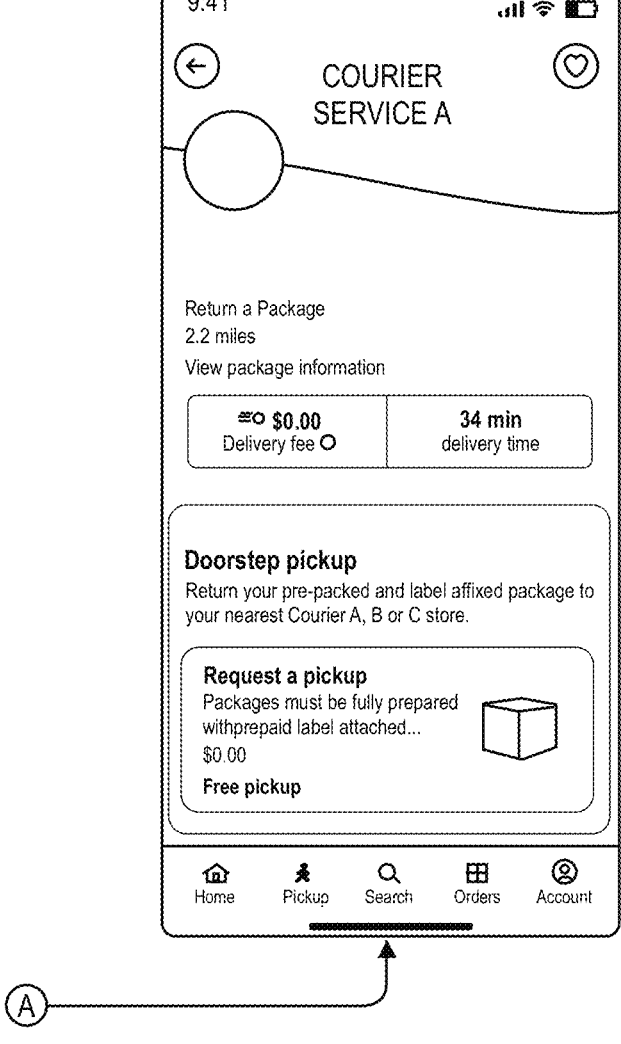

In FIG. 6C shows a user interface 606 that provide instruction to the end user in the return process, as well as the cost of the return, and the amount of time for the return.

Figure 6D:
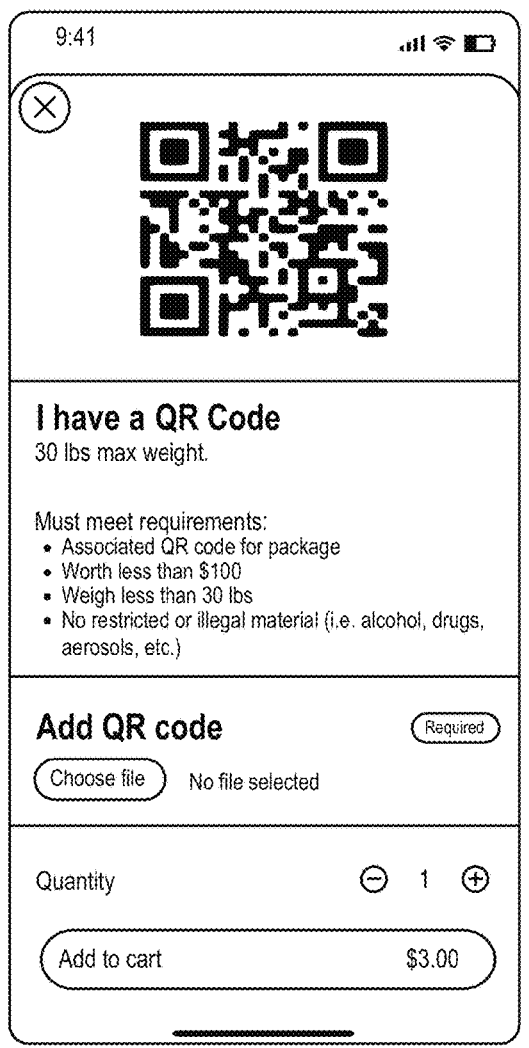

FIG. 6D shows a user interface 608 additional details regarding the pickup process. The item may have to comply with certain rules including a specific weight or size limit, a certain item value (e.g., no items more than $10,000), and an option to add a QR code. The end user can select the "choose file" button to choose a file containing the QR code.

Figure 6E:
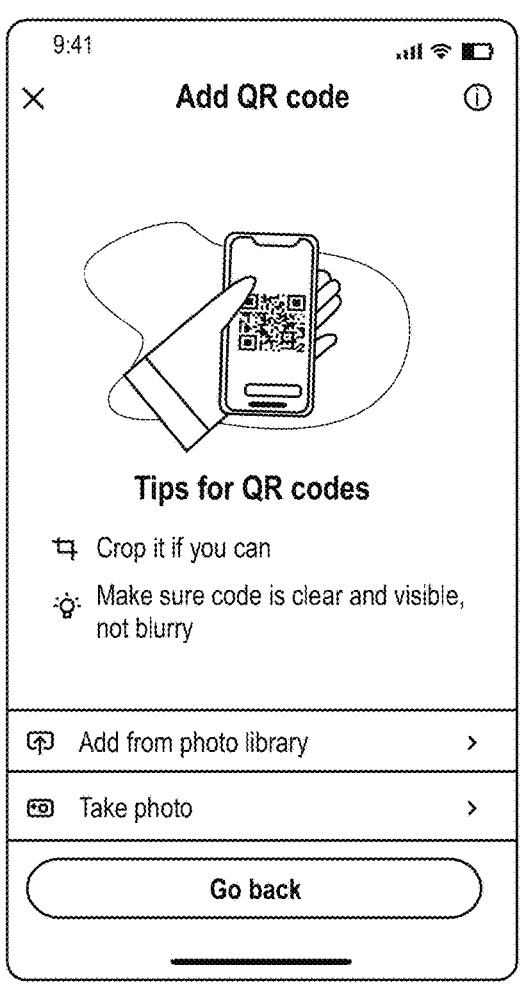

FIG. 6E shows a user interface with options for the user to take a photo of a QR code or add a photo from a library on the user device. Information regarding the return can then be provided to the server computer to process the return via the QR code or other machine readable code. For example, the server computer could transmit the machine readable code to the transporter's user device. The transporter could present the machine readable code to the service provider when the transporter delivers the item to the service provider.

Figure 6F:
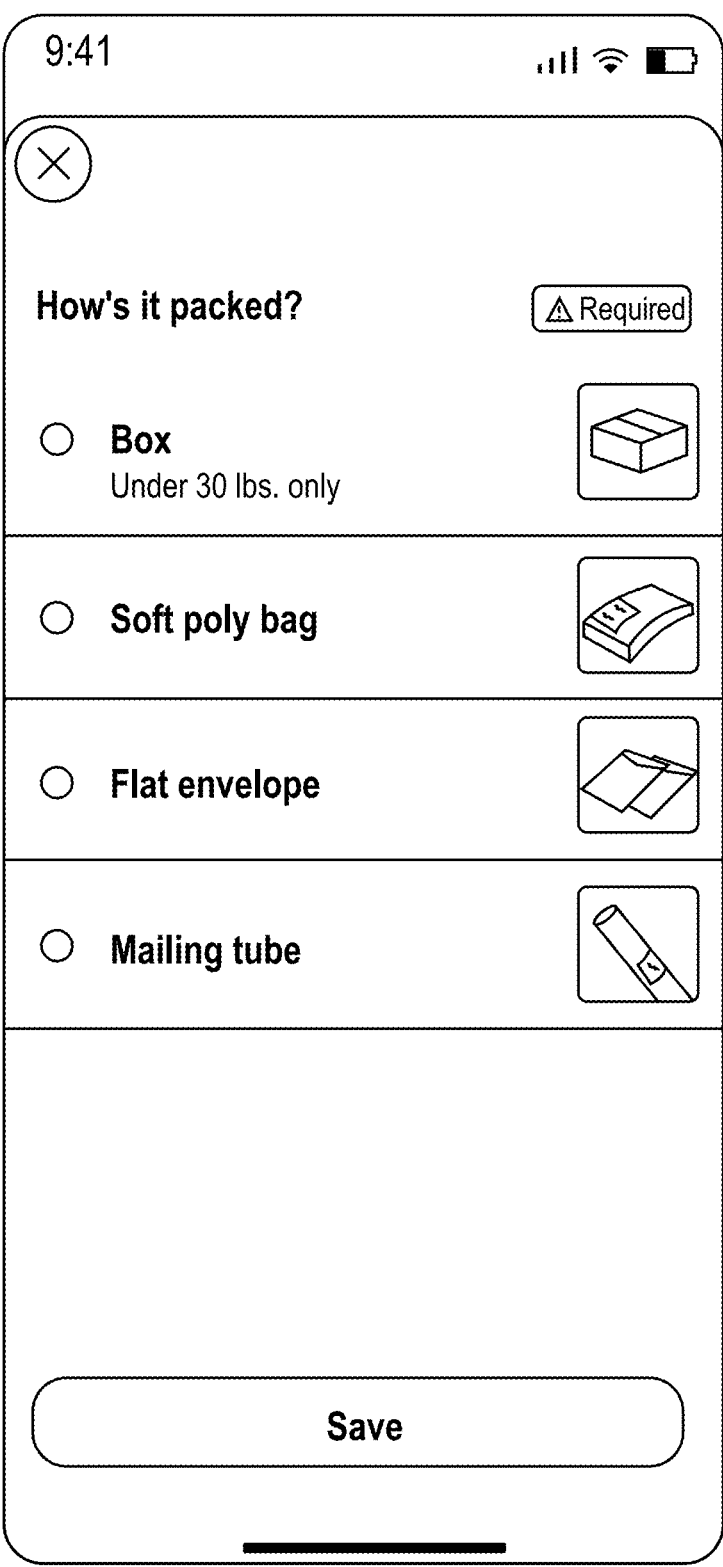

FIG. 6F shows a user interface where the end user can provide information about the item to be returned. The end user can select buttons to indicate how the item is packed (e.g., box, flat envelope, etc.).

Figure 6G:
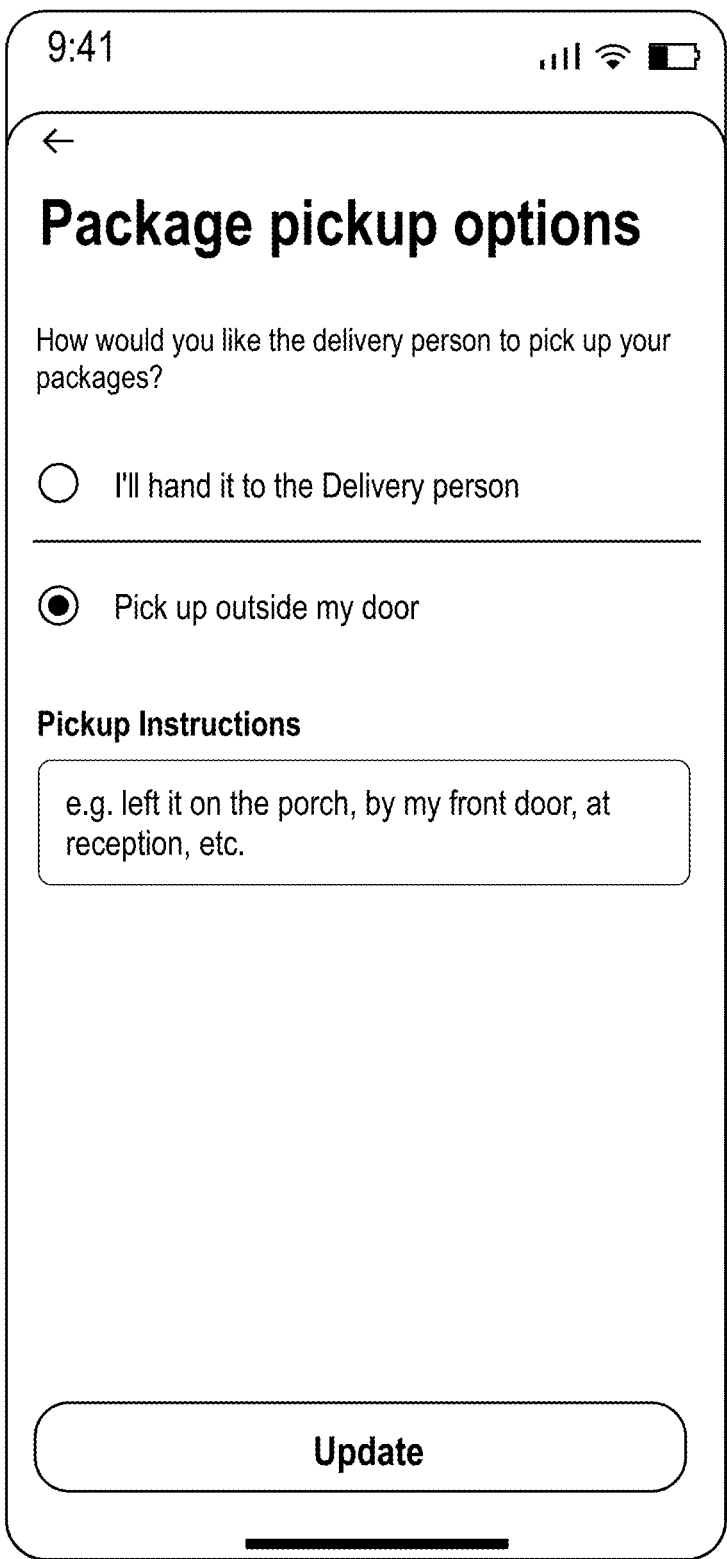

FIG. 6G shows a user interface with options for the end user to choose how the transporter will receive the item to be returned. For example, the user can choose to allow the transporter to personally hand the item to be returned to the transporter, or leave the packaged item outside of the door of the end user's home.

FIG. 6H shows a user interface showing the total cost of the return. Here, the return cost can be $0.00.

FIG. 6I also shows a user interface which shows the delivery time and details of the return (e.g., where the item is being transported from and to), and the ability to provide the transporter with a gratuity.

Figures 7A, 7B, 7C:
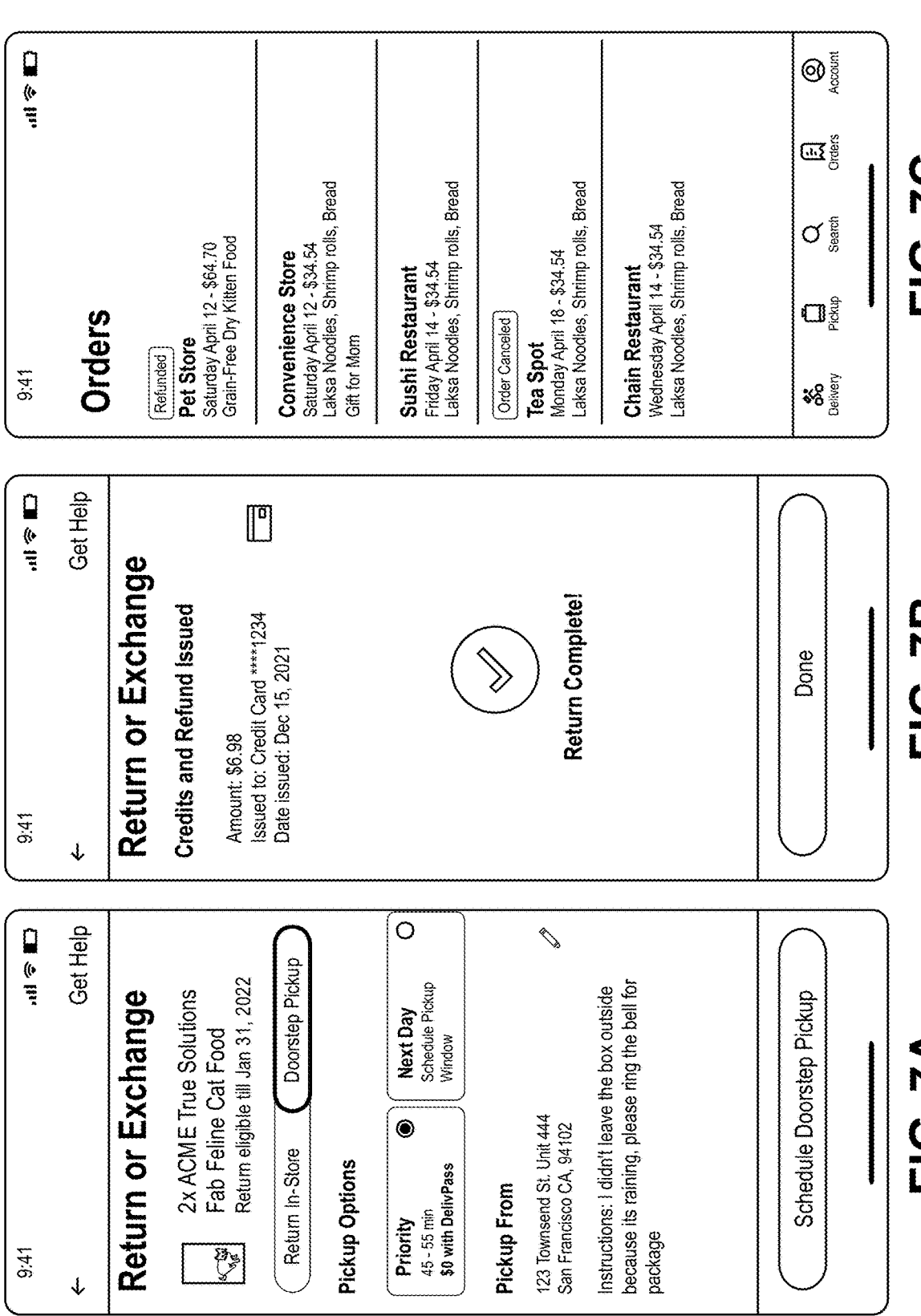
FIGS. 7A-7C show illustrations of other user interfaces that can be presented to an end user via an end user device when placing a return order with the server computer.

FIGS. 7A-7C show other user interfaces that can be presented to an end user via an end user device during a returns process. FIG. 7A shows different pick up options that can be provided to an end user. FIG. 7B shows a message indicating to the end user that the return and refund have been completed. FIG. 7C shows that refunds for returns can be displayed with purchases made from service providers using a delivery application.

Figure 8A:
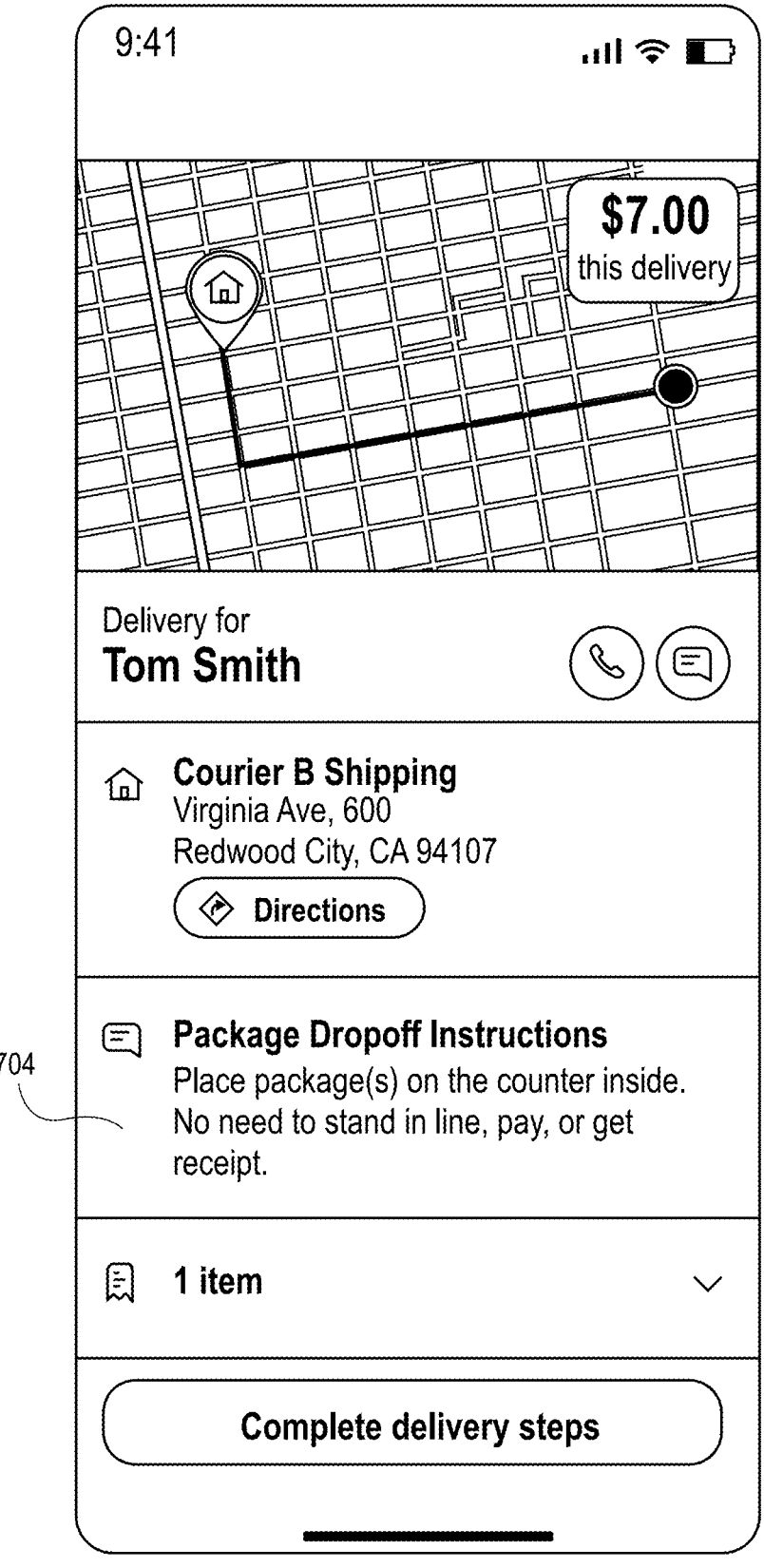

FIG. 8A user a user interface of a user interface presented to a transporter by a delivery application on a transporter user device. The user interface shows a map showing one or more delivery routes from the end user to a service provider to deliver an item to the service provider. The section 804 of the user interface provides instructions on actions that the transporter is to perform when they arrive at the service provider. The user interface also show how many items are to be returned and the address of the service provider that is to receive the returned items.

Figure 8C:
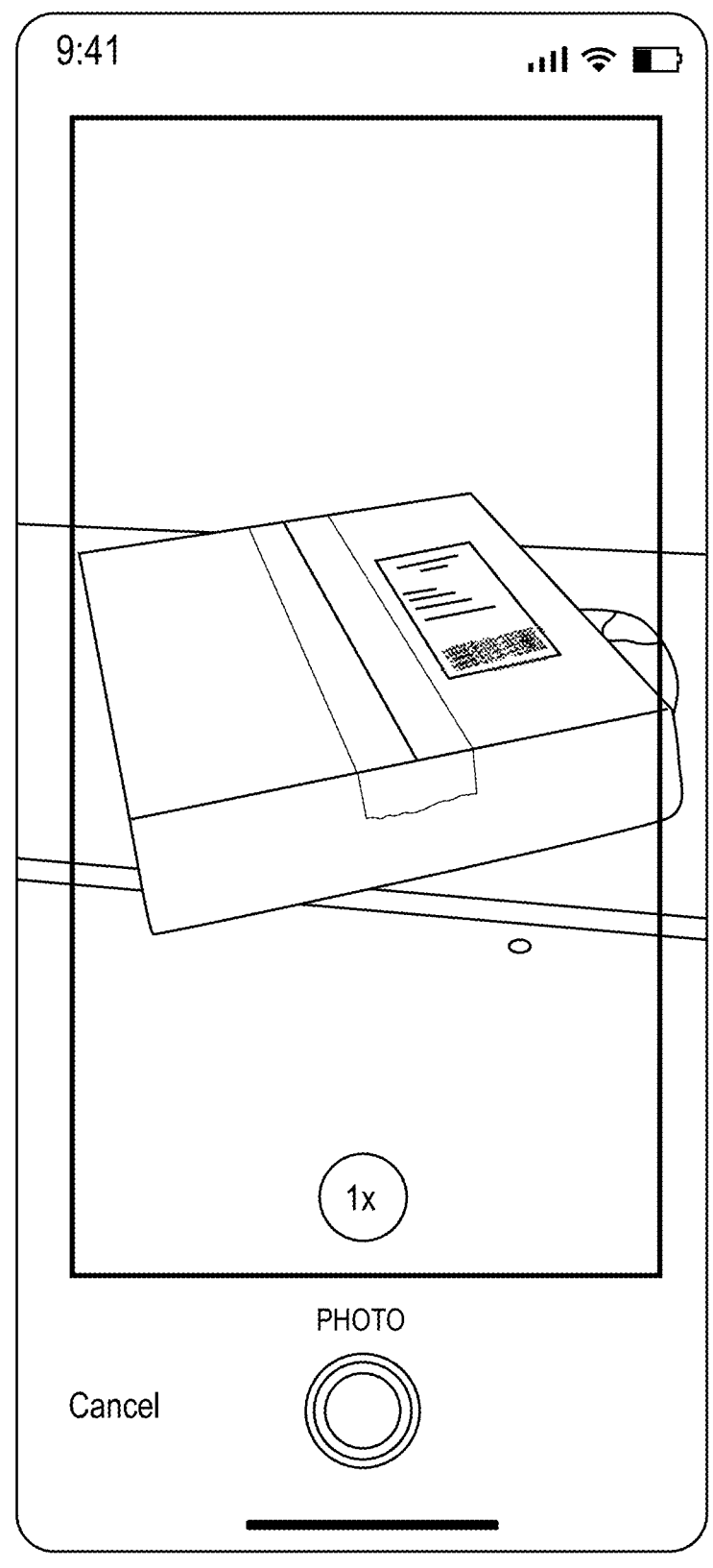

FIG. 8B shows a user interface including an option to take a photo of where the transporter left the item to be returned. FIG. 8C shows an image of the item as it is left with the service provider by the transporter. This photo can be shared with the end user via the server computer.

Other embodiments include an end user initiating a return order to return an item from an end user to a service provider with the server computer. After receiving the return order, the server computer can notify the end user that it is ready to pick up the return at a time when it is more efficient for a transporter associated with the server computer to do so. For example, an end user may indicate to the server computer that it has an item to return to a service provider. The server computer can inform the end user when it will have a transporter pick up the item to be returned. If the transporter can retrieve the item when it is efficient or cost effective to do so, then the return can be free or less costly to the end user. Otherwise, the server computer can pick it up at a scheduled time. As an example, an end user has a package to return to Nordstrom, and the end user has a choice. The end user can pay $6 to have it returned tomorrow, or the end user can have it returned for $1 if the server computer chooses the pickup time.

FIG. 9 shows another return method according to embodiments.

In step S920, the method includes receiving, by a server computer data relating to a plurality of delivery orders from service providers to end users, and data relating to a plurality of end user initiated orders from end users to service providers. The end user initiated orders can be return orders.

In step S940, the method can also include receiving, by the server computer, a return request from an end user to deliver an item to a service provider.

In step S960, after receiving the return request, the server computer can determine an optimal time to pick up the item from the end user and deliver the item to the service provider. The optimal time may be based on user input. For example, if the user specified a specific time window to pick up the item, then the optimal time may correspond to the specified pickup time window. If the end user indicated a broader, non-specific time window (e.g., in the next two days), then the server computer can determine an optimal time to pick up the item based on the routes traversed by the transporters that it is and will be communicating with. For example, a transporter is expected to pass by the end user's residence while picking up or delivering a different item for another end user, then the optimal time may be the time when the transporter is expected to pass by the end user's residence.

In step S980, the method also includes notifying, by the server computer, the end user that a transporter can pick up the item from the end user and deliver the item to the service provider.

In step S984, the transporter, upon arriving at the end user's location, can inspect the item to ensure that it is suitable for a return. The transporter could, for example, inspect the item for any damage, ensure that the item is still operative (e.g., by turning on the power), etc. After the transporter confirms that the item is suitable for a successful return, the transporter may use a transporter device to send an item confirmation message to the server computer confirming that the item is suitable for return. The server computer can then receive the item confirmation message from the transporter that the item is suitable for return to the service provider.

In step S986, the transporter can then deliver the item from the end user to the service provider.

In step S990, the method includes receiving, a confirmation from the transporter that the item has been delivered to the service provider.

Although many of the specific embodiments discussed above describe the return of items from an end user to a service provider, some embodiments are not limited to returns. For example, some embodiments can be applied in other areas including dry cleaning (instead of picking up an end user's package, the transporter can pick up the end user's laundry).

Embodiments of the invention have a number of technical advantages. As noted above, embodiments of the invention can include a onboarding interface that allows service providers to customize return delivery options. The return delivery options can be customized by item, store, location, etc. Different procedures and instructions can be provided and executed depending upon the type of item being returned and the service provider receiving the item. As such, embodiments of the invention are scalable, and different return procedures need not be created and implemented by the service providers receiving returned items.

Other embodiments include item validation processing associated with returns of items by transporters in a distributed fleet of transporters. The item validation processing that is performed by the transporters can ensure that the return of items to service providers is successful and efficient.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

providing, by a server computer to a second service provider computer, an onboarding interface for onboarding a second service provider operating the second service provider computer to accept returns of items initiated by end users and from a plurality of available transporters, wherein the onboarding interface is configured to receive selections of returns processing options from a plurality of service providers;

receiving, by the server computer, one or more selections of the returns processing options from the second service provider via the second service provider computer via the onboarding interface;

storing, by the server computer, the selected returns processing options;

receiving, by the server computer, a return order for a return of a non-food item to the second service provider from an end user device of an end user; and receiving, by the server computer from the end user device, a fulfillment request message comprising at least a food item;

providing, by the server computer, the fulfillment request message to a first service provider computer operated by a first service provider, wherein the first service provider initiates preparation of at least the food item;

determining, by the server computer, one or more transporter user devices;

providing, by the server computer, the fulfillment request message to the one or more transporter user devices;

receiving, by the server computer, an acceptance message from a transporter user device of the one or more transporter user devices; and processing, by the server computer, the return order according to the selected and stored returns processing options using a transporter, wherein processing the return order comprises communicating the selected and stored returns processing options to the end user device operated by the end user and the transporter user device operated by the transporter, wherein the transporter operates a transportation device, the transportation device being a vehicle, and wherein the transporter delivers the food item from the first service provider to the end user at an end user location, and then obtains the non-food item from the end user and delivers the non-food item to the second service provider.

2. The method of claim 1, wherein the returns processing options include allowing the second service provider to set return eligibility criteria.

3. The method of claim 1, wherein the returns processing options allow the second service provider to set validation procedures.

4. The method of claim 3, wherein the validation procedures include how and when an order is validated and how and when a refund is processed.

5. The method of claim 1, wherein the returns processing options allow the second service provider to set return procedures.

6. The method of claim 1, wherein the first service provider is a restaurant and the second service provider is a retailer.

7. The method of claim 1, wherein the transporter user device is a mobile phone.

8. The method of claim 7, wherein data associated with the selected and stored returns processing options comprises instructions to the transporter to validate that the non-food item is operational and/or is in satisfactory condition.

9. The method of claim 7, wherein the transportation device is a car.

10. The method of claim 9, wherein the non-food item is a packaged item.

11. The method of claim 2, wherein the end user device is a mobile phone.

12. The method of claim 11, wherein the first service provider is a restaurant.

13. The method of claim 10, wherein processing the return order further comprises receiving, by the server computer, data relating to a machine readable code encoding data associated with the return of the non-food item to the second service provider, and providing, by the server computer, the machine readable code to the transporter user device operated by the transporter, wherein the second service provider scans the machine readable code from the transporter user device when the transporter delivers the non-food item to the second service provider.

14. The method of claim 13, wherein the machine readable code is a QR code.

15. A server computer comprising:

a processor; and a computer readable medium coupled to the processor, the computer readable medium comprising code, executable by the processor, for implementing operations comprising:

providing, to a second service provider computer, an onboarding interface for onboarding a second service provider operating the second service provider computer to accept returns of items initiated by end users and from a plurality of available transporters, wherein the onboarding interface is configured to receive selections of returns processing options from a plurality of service providers;

receiving one or more selections of the returns processing options from the second service provider via the second service provider computer via the onboarding interface;

storing the selected returns processing options;

receiving a return order for a return of a non-food item to the second service provider from an end user device of an end user;

receiving, from the end user device, a fulfillment request message comprising at least a food item;

providing the fulfillment request message to a first service provider computer operated by a first service provider, wherein the first service provider initiates preparation of at least the food item;

determining one or more transporter user devices;

providing the fulfillment request message to the one or more transporter user devices;

receiving an acceptance message from a transporter user device of the one or more transporter user devices; and processing the return order according to the selected and stored returns processing options using a transporter, wherein processing the return order comprises communicating the selected and stored returns processing options to the end user device operated by the end user and the transporter user device operated by the transporter, wherein the transporter operates a transportation device, the transportation device being a vehicle, and wherein the transporter delivers the food item from the first service provider to the end user at an end user location, and then obtains the non-food item from the end user and delivers the non-food item to the second service provider.

16. The server computer of claim 15, wherein the onboarding interface comprises an item identifier data field, a return expiration data field, and return criteria data fields.

17. The server computer of claim 15, wherein processing the return order further comprises receiving, by the server computer, data relating to a machine readable code encoding data associated with the return of the non-food item to the second service provider, and providing, by the server computer, the machine readable code to the transporter user device operated by the transporter, wherein the second service provider scans the machine readable code from the transporter user device when the transporter delivers the non-food item to the second service provider.

18. The server computer of claim 15, wherein the non-food item is a packaged good.

19. The server computer of claim 15, wherein the returns processing options include allowing the second service provider to set returns eligibility criteria.

20. The server computer of claim 15, wherein the returns processing options include allowing the second service provider to set returns validation criteria.

* * * * *